US012759367B1

(12) United States Patent
Ellifson et al.

(10) Patent No.: US 12,759,367 B1
(45) Date of Patent: Oct. 13, 2026

(54) POSITION DEPENDENT DAMPER

(71) Applicant: Oshkosh Defense, LLC, Oshkosh, WI (US)

(72) Inventors: Erik S. Ellifson, Oshkosh, WI (US); Patrick S. Dillman, Lannon, WI (US); Jason J. Zuleger, Appleton, WI (US); Aaron J. Rositch, Oshkosh, WI (US); Robert K. Sollenskog, Oshkosh, WI (US)

(73) Assignee: Oshkosh Defense, LLC, Oshkosh, WI (US)

( * ) Notice: Subject to any disclaimer, the term of this patent is extended or adjusted under 35 U.S.C. 154(b) by 0 days.

(21) Appl. No.: 19/252,774

(22) Filed: Jun. 27, 2025

Related U.S. Application Data

(63) Continuation of application No. 18/762,101, filed on Jul. 2, 2024, now Pat. No. 12,370,860, which is a continuation of application No. 18/196,792, filed on May 12, 2023, now Pat. No. 12,054,027, which is a continuation of application No. 17/464,396, filed on Sep. 1, 2021, now Pat. No. 11,685,219, which is a continuation of application No. 16/512,109, filed on Jul. 15, 2019, now Pat. No. 11,135,890, which is a continuation of application No. 15/804,475, filed on Nov. 6, 2017, now Pat. No. 10,369,860, which is a (Continued)

(51) Int. Cl.

| | |
|---|---|
| ***F16F 9/19*** | (2006.01) |
| ***B60G 11/26*** | (2006.01) |
| ***B60G 13/08*** | (2006.01) |
| ***B60G 17/08*** | (2006.01) |
| ***B60G 21/073*** | (2006.01) |
| ***F16F 9/28*** | (2006.01) |
| ***F16F 9/346*** | (2006.01) |
| ***F16F 9/48*** | (2006.01) |
| *F16F 9/18* | (2006.01) |

(52) U.S. Cl.

CPC ............ *B60G 17/08* (2013.01); *B60G 11/265* (2013.01); *B60G 13/08* (2013.01); *B60G 21/073* (2013.01); *F16F 9/19* (2013.01); *F16F 9/28* (2013.01); *F16F 9/346* (2013.01); *F16F 9/48* (2013.01); *B60G 2202/24* (2013.01); *B60G 2500/10* (2013.01); *F16F 9/185* (2013.01)

(58) Field of Classification Search

CPC .................................. F16F 9/48; F16F 9/185

USPC .......... 280/124.161, 124.16, 124.157, 5.512, 280/5.515; 188/266, 266.1, 266.2, 281, 188/284, 285, 286, 287, 297, 313, 314, 188/315, 316, 322.13, 322.2

See application file for complete search history.

(56) References Cited

U.S. PATENT DOCUMENTS 1,117,057 A * 11/1914 Kohner .................... F16F 9/44 188/129
5,161,653 A * 11/1992 Hare, Sr. ................ F16F 9/532 188/300

* cited by examiner

*Primary Examiner* — Keith J Frisby
(74) *Attorney, Agent, or Firm* — Foley & Lardner LLP

(57) ABSTRACT

A damper assembly includes a housing including a wall defining a first aperture fluidly coupled to a second aperture, a first tubular member coupled to the housing, a second tubular member extending between the wall and the first tubular member, a first plunger coupled to the second tubular member and in sliding engagement with an inner surface of the wall and an outer surface of the first tubular member, a third member extending within the first tubular member, and a second plunger coupled to the third member and in sliding engagement with an inner surface of the first tubular member.

18 Claims, 23 Drawing Sheets

Related U.S. Application Data continuation of application No. 15/048,931, filed on Feb. 19, 2016, now Pat. No. 9,809,080, which is a continuation of application No. 14/334,305, filed on Jul. 17, 2014, now Pat. No. 9,291,230, which is a continuation of application No. 13/792,154, filed on Mar. 10, 2013, now Pat. No. 8,801,017.

(60) Provisional application No. 61/615,717, filed on Mar. 26, 2012.

POSITION DEPENDENT DAMPER

CROSS-REFERENCE TO RELATED PATENT APPLICATIONS

This application is a continuation of U.S. application Ser. No. 18/762,101, filed Jul. 2, 2024, which is a continuation of U.S. application Ser. No. 18/196,792, filed May 12, 2023, now U.S. Pat. No. 12,054,027, which is a continuation of U.S. application Ser. No. 17/464,396, filed Sep. 1, 2021, now U.S. Pat. No. 11,685,219, which is a continuation of U.S. application Ser. No. 16/512,109, filed Jul. 15, 2019, now U.S. Pat. No. 11,135,890, which is a continuation of U.S. application Ser. No. 15/804,475, filed Nov. 6, 2017, now U.S. Pat. No. 10,369,860, which is a continuation of U.S. application Ser. No. 15/048,931, filed Feb. 19, 2016, now U.S. Pat. No. 9,809,080, which is a continuation of U.S. application Ser. No. 14/334,305, filed Jul. 17, 2014, now U.S. Pat. No. 9,291,230, which is a continuation of U.S. application Ser. No. 13/792,154, filed Mar. 10, 2013, now U.S. Pat. No. 8,801,017, which claims the benefit of U.S. Provisional Patent Application No. 61/615,717, filed Mar. 26, 2012, all of which are incorporated herein by reference in their entireties.

BACKGROUND

The present application relates generally to the field of suspension systems for vehicles. More specifically, the present application relates to hydraulic dampers. Dampers (i.e. dashpots, hydraulic shock absorbers, etc.) dissipate kinetic energy as part of a vehicle suspension system. Dampers often include a housing, end caps, a piston, and a rod that is coupled to the piston. Energy is dissipated through a hydraulic fluid flow along a hydraulic circuit (e.g., between a first chamber within the housing to a second chamber within the housing). The piston includes a plurality of orifices that are covered with a shim stack (i.e. a plurality of compressed shims). As the piston moves through the housing, hydraulic fluid is forced from the first chamber, through the piston, and into the second chamber. Specifically, pressurized hydraulic fluid is forced through the orifices within the piston, deflects a portion of the shims to create an opening, and flows into the second chamber by passing through the opening. Such traditional dampers provide a damping force that does not vary based on the location of the piston along the length of the housing.

Traditional vehicle suspension systems incorporate/these dampers and other devices as part of a suspension damping strategy. By way of example, the vehicle suspension may also include a spring coupled in parallel with the damper to a swing arm. In jounce, the damper and the spring are compressed, and the damper imparts a resistive force. Such a vehicle suspension strategy results in large total force that is transmitted to the occupants of the vehicle.

SUMMARY

One embodiment of the invention relates to a damper assembly for a vehicle suspension system that includes a first damper and a second damper. The second damper includes a housing including a wall that defines an aperture, the wall and the first damper at least partially defining a chamber. The second damper also includes a piston positioned within the chamber, a conduit defining a flow path that includes the aperture, and a flow control device disposed along the flow path. The second damper is configured to provide a damping force that varies based on the position of the piston within the chamber.

Another embodiment of the invention relates to a damper assembly for a vehicle suspension system that includes a housing, a piston, a conduit, and a flow control device. The housing includes a wall that defines an inner volume and an aperture. The piston is disposed within the inner volume and configured to move along a length of the housing. The conduit defines a flow path that includes the aperture. The flow control device is disposed along the flow path. The flow control device is configured to provide a first level of damping as fluid flows along the flow path in a first direction. The flow control device is configured to provide a second level of damping as the fluid flows along the flow path in a second direction.

Still another embodiment of the invention relates to a vehicle that includes a wheel assembly, a chassis, and a damper assembly coupling to the wheel assembly to the chassis. The damper assembly includes a tubular member, a plunger positioned within the tubular member, a housing that receives the tubular member, a piston, and a flow control device. The housing includes a wall that defines an aperture that is part of a flow path. A volume between the wall and the first damper defines a chamber. The piston is positioned within the chamber. The flow control device is disposed along the flow path. The second damper is configured to provide a damping force that varies based on a position of the piston within the chamber.

The invention is capable of other embodiments and of being carried out in various ways. Alternative exemplary embodiments relate to other features and combinations of features as may be recited in the claims.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
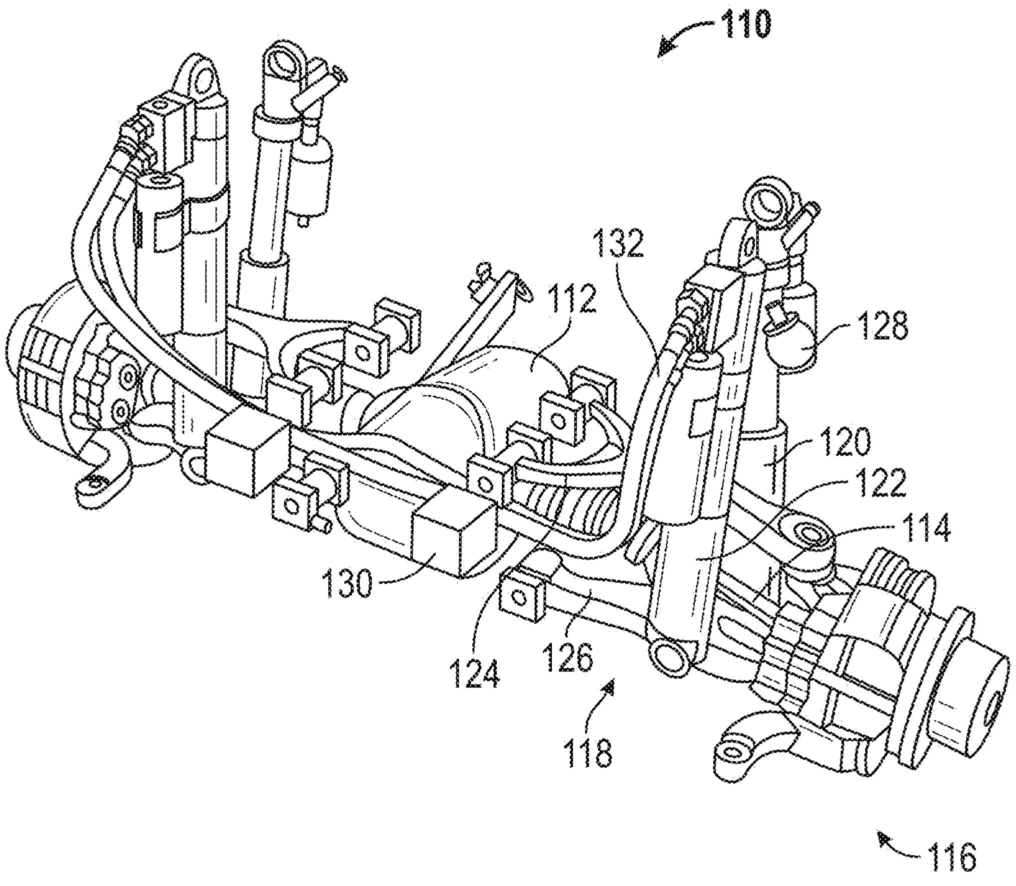
FIG. 1 is an elevation view of an axle assembly, according to an exemplary embodiment.

Referring to the exemplary embodiment shown in FIG. 1, an axle assembly 110 is configured to be included as part of a vehicle. The vehicle may be a military vehicle, a utility vehicle (e.g., a fire truck, a tractor, construction equipment, a sport utility vehicle, etc.), or still another type of vehicle. As shown in FIG. 1, axle assembly 110 includes a differential 112 coupled to a half shaft 114. As shown in FIG. 1, half shaft 114 is coupled to a wheel-end assembly 116. The wheel-end assembly 116 may include brakes, a gear reduction, steering components, a wheel hub, a wheel, a tire, and other features. According to an exemplary embodiment, the differential 112 is configured to be coupled to a drive shaft of the vehicle. Such a differential 112 may receive rotational energy from a prime mover (e.g., a diesel engine, a gasoline engine, an electric motor, etc.) of the vehicle. The differential 112 then allocates torque provided by the prime mover between the half shafts 114 of the axle assembly 110. The half shafts 114 deliver the rotational energy to each wheel-end assembly 116. According to an alternative embodiment, each wheel-end assembly 116 includes a prime mover (e.g., the axle assembly 110 includes electric motors that each drive one wheel).

According to an exemplary embodiment, the axle assembly 110 includes a suspension system 118 that couples the chassis of the vehicle to wheel-end assembly 116. In some embodiments, the chassis includes a pair of opposing frame rails, and the suspension system 118 engages the opposing frame rails through side plate assemblies. In other embodiments, the chassis is a hull, a capsule, or another type of structural member. According to an exemplary embodiment, the suspension system 118 includes a spring, shown as gas spring 120, and a damper, shown as hydraulic damper 122. As shown in FIG. 1, the gas spring 120 and the hydraulic damper 122 are coupled in parallel to a lower support member, shown as lower swing arm 126. According to an exemplary embodiment, the wheel-end assembly 116 is coupled to lower swing arm 126 and an upper support member, shown as upper swing arm 124.

According to an exemplary embodiment, the vehicle is configured for operation on both smooth (e.g., paved) and uneven (e.g., off-road, rough, etc.) terrain. As the vehicle travels over uneven terrain, the upper swing arm 124 and the lower swing arm 126 guide the vertical movement of the wheel-end assembly 116. A stop, shown as cushion 128, provides an upper bound to the movement of the wheel-end assembly 116. It should be understood that axle assembly 110 may include similar components (e.g., wheel end assemblies, suspension assemblies, swing arms, etc.) for each of the two opposing lateral sides of a vehicle.

Figure 2:
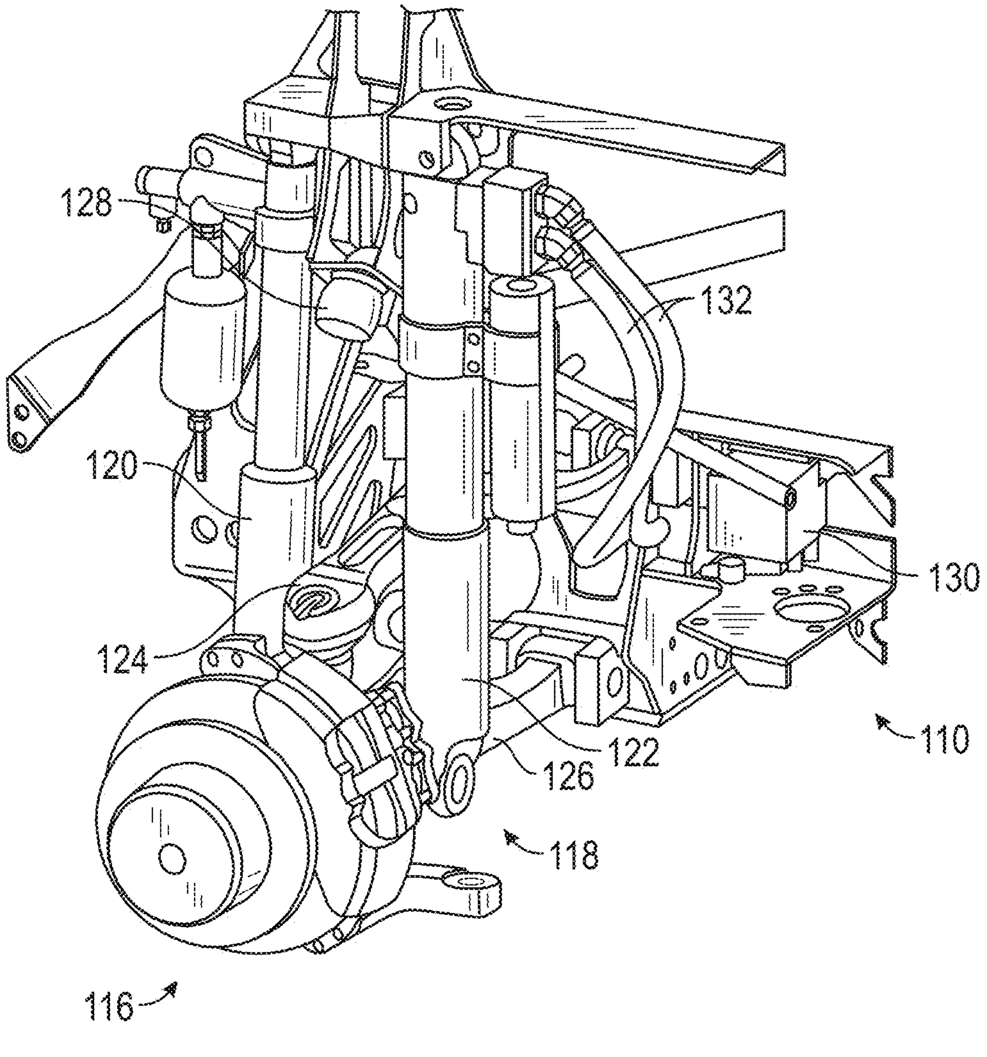
FIG. 2 is an elevation view of a suspension system, according to an exemplary embodiment.

Referring next to the exemplary embodiment shown in FIG. 2, the suspension system 118 includes various components configured to improve performance of the vehicle. As shown in FIG. 2, gas spring 120 is a high pressure gas spring. According to an exemplary embodiment, the suspension system 118 includes a pump, shown as high-pressure gas pump 130, that is coupled to gas spring 120. In some embodiments, suspension system 118 includes a plurality of high-pressure gas pumps 130 each coupled to a separate gas spring 120. In other embodiments, the suspension system 118 includes fewer high-pressure gas pumps 130 than gas springs 120. According to an exemplary embodiment, the gas spring and the pump include gas made up of at least 90% inert gas (e.g., nitrogen, argon, helium, etc.). The gas may be stored, provided, or received in one or more reservoirs (e.g., tank, accumulators, etc.). During operation, the high-pressure gas pump 130 selectively provides gas, under pressure, to at least one of the gas springs 120 and the reservoir. In some embodiments, at least one of the gas springs 120 and the hydraulic dampers 122 receive and provide a fluid (e.g., gas, hydraulic fluid) to lift or lower the body of the vehicle with respect to the ground thereby changing the ride height of the vehicle.

Figure 3:
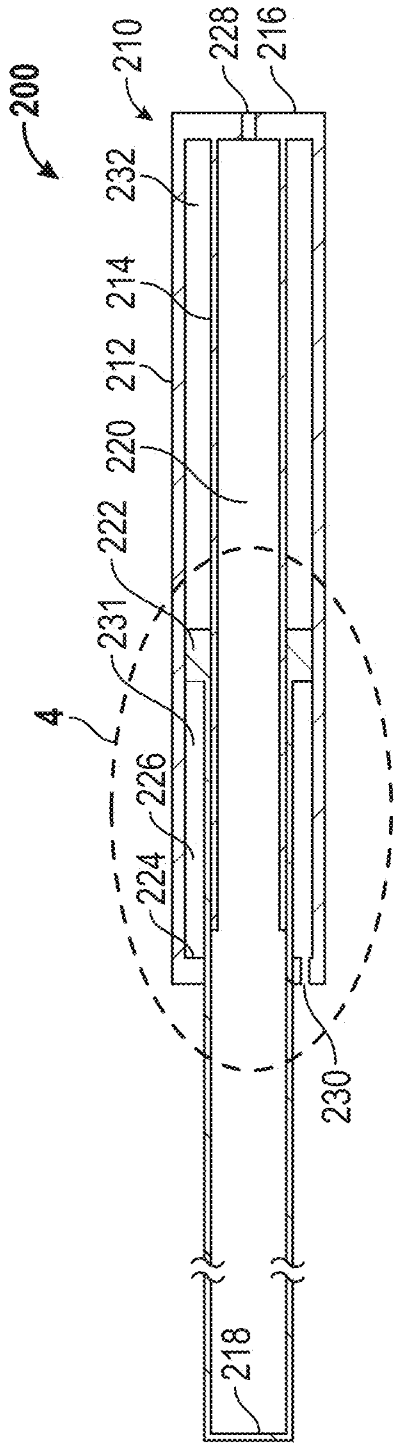
FIGS. 3-4 are sectional views of an inner damper assembly, according to an exemplary embodiment.
Figure 4:
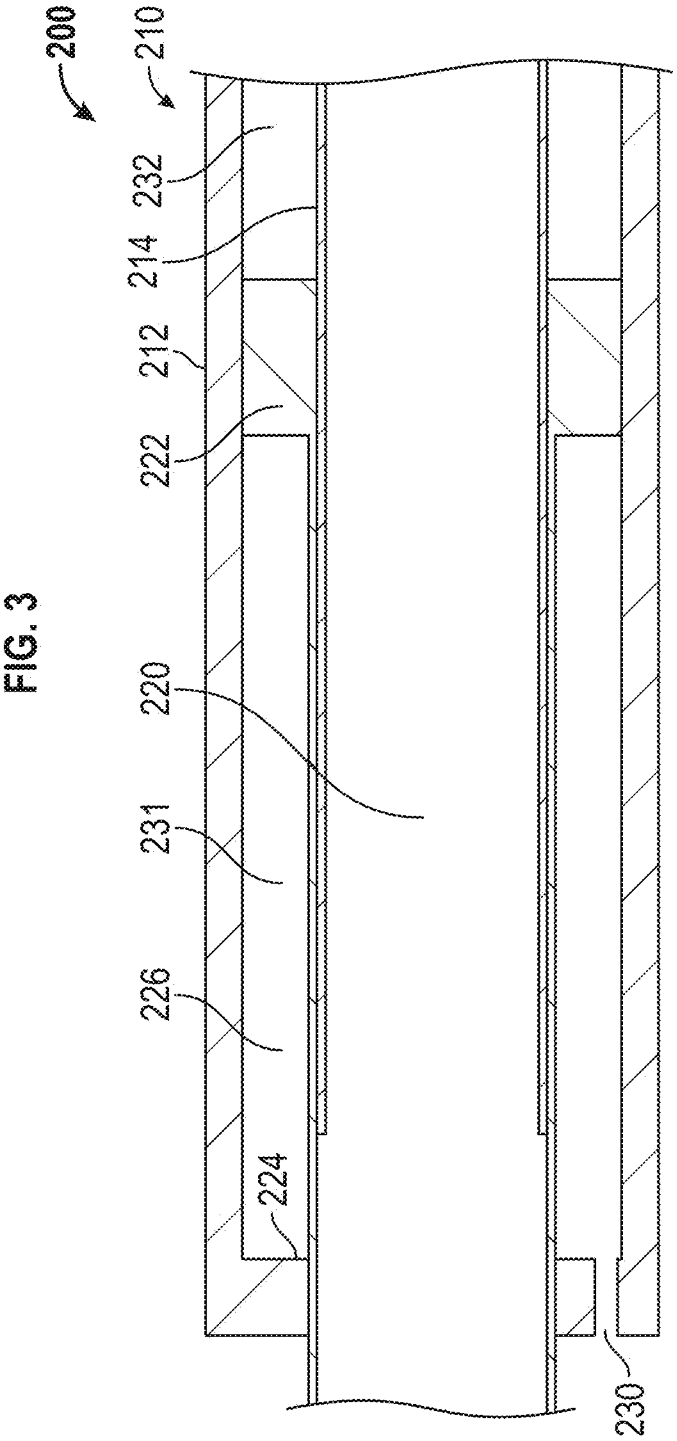

Referring next to the exemplary embodiment shown in FIGS. 3-4, a damper includes a base damper, shown as inner damper assembly 210. According to an exemplary embodiment, hydraulic damper 200 is included as part of a suspension system and an axle assembly. As shown in FIGS. 3-4, hydraulic damper 200 includes a housing, shown as outer cylinder 212, and a tubular element, shown as inner cylinder 214. According to an exemplary embodiment, the inner cylinder 214 is disposed at least partially within the outer cylinder 212. A first end, shown as cap 216, is coupled to an end of both the inner cylinder 214 and the outer cylinder 212. A tubular element, shown as plunger 218, is slidably coupled to the inner cylinder 214 and received within the outer cylinder 212. A second end, shown as cap 224, couples outer cylinder 212 to plunger 218. A first chamber 220 is defined by the an inner surface of the plunger 218, the cap 216, and an inner surface of the inner cylinder 214. According to an exemplary embodiment, movement of the plunger 218 relative to the inner cylinder 214 changes the volume of the first chamber 220. A second chamber 226 is defined by cap 224, an inner surface of outer cylinder 212, and cap 216.

According to the exemplary embodiment shown in FIGS. 3-4, the inner damper assembly 210 further includes a piston, shown as plunger 222, positioned within the second chamber 226. According to an exemplary embodiment, plunger 222 is disk-shaped and defines a circular aperture thereby forming an annular ring. As shown in FIGS. 3-4, the plunger 222 is coupled to plunger 218. The plunger 222 separates second chamber 226 into a compression chamber 232 and an extension chamber 231. The second chamber 226 is an annular chamber and may include one or more subchambers in fluid communication with one another According to an exemplary embodiment, the cap 216 of inner damper assembly 210 defines a first aperture (i.e., opening, hole, conduit, etc.), shown as first aperture 228, and the cap 224 of defines a second aperture, shown as second aperture 230. As shown in FIG. 3, first aperture 228 is associated with the first chamber 220 and second aperture 230 is associated with the second chamber 226. In some embodiments, the first aperture 228 is coupled to a transfer tube and allows a fluid (e.g., hydraulic fluid, oil, gas, etc.) to flow between the first chamber 220 and other components. The second aperture may also be coupled to transfer tubes and allow a fluid to flow between second chamber 226 and other components. Valves (e.g., directional-control valves, etc.) positioned along such transfer tubes (e.g., coupled to the inner damper assembly 210, remotely positioned but in fluid communication with first chamber 220 and second chamber 226, etc.) may provide damping forces. According to an alternative embodiment, the inner damper assembly 210 functions as a spring or an accumulator (i.e. first chamber 220 and second chamber 226 may be sealed).

As shown in FIGS. 3-4, the plunger 222 is coupled to the plunger 218 such that the plunger 222 and the plunger 218 travel at the same rate. According to an exemplary embodiment, the plunger 218 may slide toward cap 216 thereby pushing fluid out of the first chamber 220. The plunger 222 may also slide toward cap 216 at the same rate thereby drawing fluid into the extension chamber 231 of second chamber 226. According to an alternative embodiment, the plunger 222 is fixed to the inner cylinder 214 and slides relative to both the plunger 218 and the outer cylinder 212.

According to an exemplary embodiment, an end portion of the plunger 218 (e.g., the portion that is orthogonal to a longitudinal axis of plunger 218) has a cross-sectional area that is substantially equal (e.g., within ten percent) to the portion of the plunger 222 that is exposed to extension chamber 231. The substantially equal cross-sectional areas provide a one-to-one working area ratio. According to an exemplary embodiment, the rate of volume change within the first chamber 220 is equal to the rate of volume change within the extension chamber 231 (i.e. the rate that hydraulic fluid exits first chamber 220 and extension chamber 231 is equal to the rate that hydraulic fluid enters the other of first chamber 220 and extension chamber 231).

According to an exemplary embodiment, inner damper assembly 210 operates independently (i.e. not cross-linked with other dampers). The first aperture 228 may be coupled to the second aperture 230 such that hydraulic fluid from one of the first chamber 220 and the second chamber 226 flows directly to the other of the first chamber 220 and the second chamber 226. A damper that couples first aperture 228 and second aperture 230 requires no make-up volume of hydraulic fluid and provides a simplified alternative to systems that utilize an intermediate accumulator or a double rod-end cylinder configuration.

As shown in FIG. 4, the face of the plunger 222 that at least partially defines the compression chamber 232 has about a twenty-five percent larger working area than the side of the plunger 222 that is defines the extension chamber 231. According to an alternative embodiment, the extension chamber 231 and the compression chamber 232 contain hydraulic fluid and the first chamber 220 forms a vacuum, contains an inert gas, or is in fluid communication with the environment. Such an inner damper assembly 210 may include a port allowing fluid flow from compression chamber 232 thereby providing an extend-to-retract ratio of about 1-to-1.25 (i.e. near equal area ratio).

Figure 5:
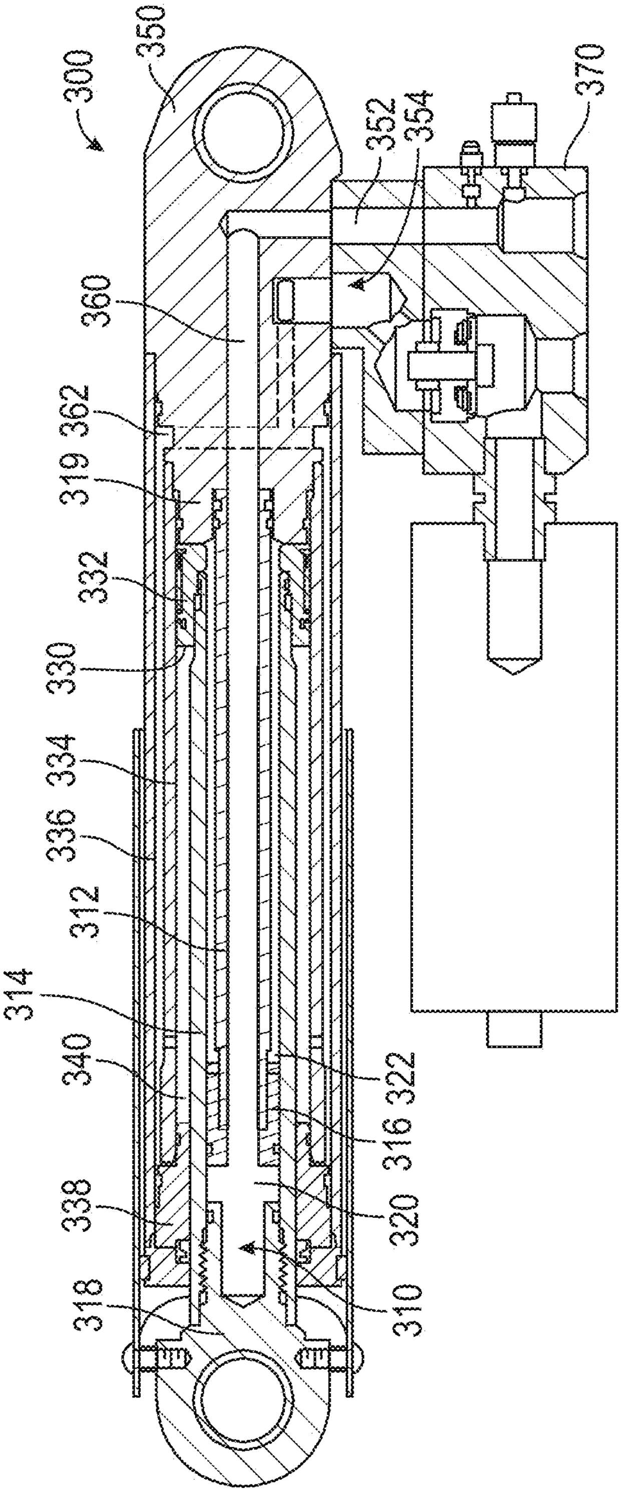
FIGS. 5-6 are sectional views of an inner damper assembly, according to an exemplary embodiment.
Figure 6:
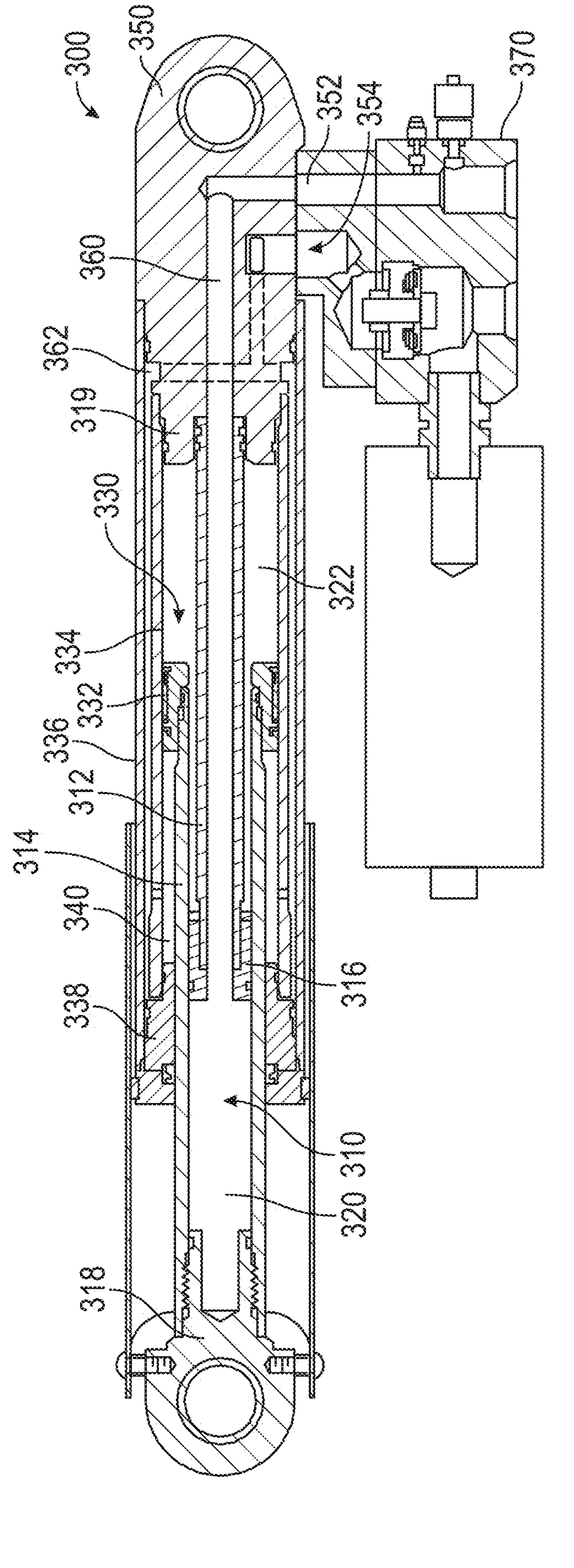

Referring next to the alternative embodiment shown in FIGS. 5-6, an inner damper assembly, shown as inner damper assembly 300, includes a first subassembly, shown as first damper assembly 310, and a second subassembly, shown as second damper assembly 330. As shown in FIG. 5-6, the first damper assembly 310 and the second damper assembly 330 are arranged coaxially to form inner damper assembly 300. According to an exemplary embodiment, inner damper assembly 300 is implemented as part of a vehicle suspension system. The first damper assembly 310 includes a tubular member, shown as plunger 312, that defines an inner volume and a piston, shown as plunger 316, coupled to an end of the plunger 312. A tubular member, shown as inner cylinder 314, is slidably coupled to plunger 316. According to an exemplary embodiment, plunger 312 and plunger 316 are positioned at least partially within an inner volume of inner cylinder 314. A cover, shown cap 318, is coupled to a first end of inner cylinder 314. As shown in FIGS. 5-6, a cover, shown as cap 319, is coupled to an end of plunger 312 and plunger 316. A first volume, shown as chamber 320, is defined by a face of plunger 316, an inner surface of inner cylinder 314, and cap 318. A second volume, shown as chamber 322, is defined by an opposing face of plunger 316, an inner surface of inner cylinder 314, an outer surface of plunger 312, and cap 319. Translation of the plunger 316 relative to inner cylinder 314 changes the volume of chamber 320 and chamber 322.

According to an exemplary embodiment, the second damper assembly 330 includes a piston, shown as plunger 332, that is fixed to an end of the inner cylinder 314 opposite cap 318. As shown in FIG. 6, the plunger 332 moves with the inner cylinder 314. A tubular member, shown as cylinder 334, and an external tubular member, shown as outer tubular member 336, each include a sidewall that defines an inner volume. As shown in FIGS. 5-6, the first damper assembly 310 and the plunger 332 are positioned at least partially within the inner volume of cylinder 334. Each of the inner damper, the plunger 332, and cylinder 334 are positioned within the inner volume of outer tubular member 336. As shown in FIGS. 5-6, an end, shown as cap 338 is coupled to an end of cylinder 334 and outer tubular member 336. The cap 338, an inner surface of cylinder 334, and outer surface of inner cylinder 314, and a surface of plunger 332 define a volume, shown as chamber 340. According to an exemplary embodiment, the cross-sectional area of the portion of plunger 316 that partially forms chamber 320 is substantially equal to the cross-sectional area of the portion of plunger 332 that partially defines chamber 340 thereby providing a one-to-one working area ratio.

The inner damper assembly 300 includes a first port 352 and a second port 354 defined within an end assembly 350. As shown in FIGS. 5-6, the plunger 312 defines a first aperture, shown as conduit 360, extending between first chamber 320 and first port 352. According to an exemplary embodiment, chamber 340 is in fluid communication with second port 354 through a flow path, shown as passage 362. As shown in FIGS. 5-6, passage 362 includes an aperture defined in a sidewall of cylinder 334, a volume between an outer surface of cylinder 334 and an inner surface of outer tubular member 336, and within a portion of the end assembly 350. According to an exemplary embodiment, the first port 352 and second port 354 are positioned along a common surface of end assembly 350. A modular valve assembly, shown as valve assembly 370, is coupled to end assembly 350 and positioned over first port 352 and second port 354.

During a mode of operation of the inner damper assembly 300, the components move relative to one another from the retracted position shown in FIG. 5 to the extended position shown in FIG. 6. According to an exemplary embodiment, the inner cylinder 314 slides away from the plunger 316, and the volume of the first chamber 320 increases. The plunger 332 slides toward the cap 338, decreasing the volume of the chamber 340. Fluid flows into the first port 352, through conduit 360 in the plunger 312 and plunger 316, and into the first chamber 320. Fluid flows from the chamber 340, through the passage 362, and to the second port 354. According to an exemplary embodiment, inner damper assembly 300 is independent (i.e. not cross-linked), and first port 352 is in fluid communication with second port 354.

Figure 7:
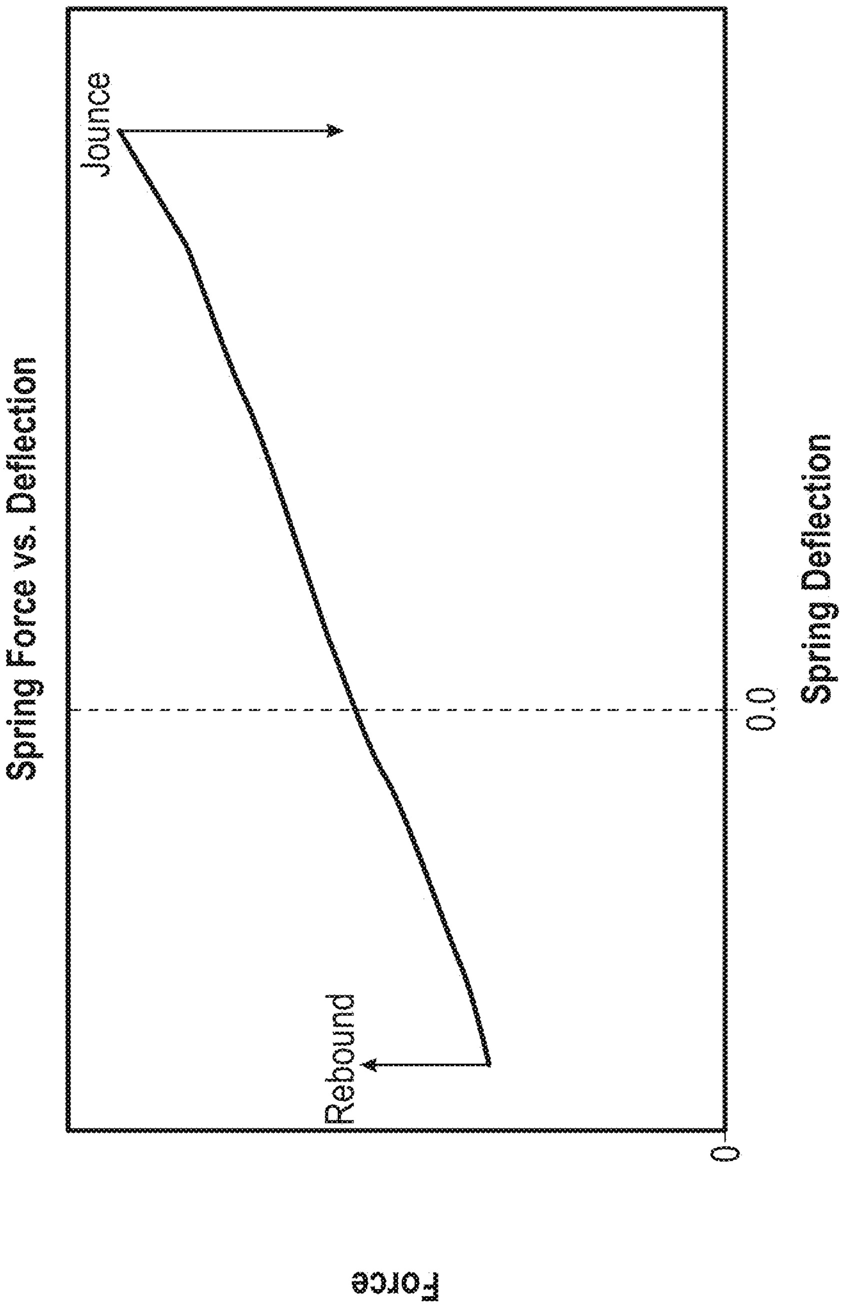
FIG. 7 is a graphical representation of force versus spring deflection for a vehicle suspension system, according to an exemplary embodiment.

According to an exemplary embodiment, the vehicle suspension system implements a spring force compensation strategy that reduces the total force imparted onto occupants within the vehicle by a road surface. It should be understood that traditional dampers generate compression forces in jounce and rebound (i.e. when the spring is compressed and extended). As shown in FIG. 7, the damper of the present application provides recoil damping in jounce when the spring forces are greatest and compressive damping in rebound when the spring force is reduced.

As the wheel encounters a positive obstacle (e.g., a bump, a curb, etc.), the wheel end travels upward from an equilibrium point (e.g., the position where the piston is located when the vehicle is traveling on flat ground) in a jounce motion. A jounce motion compresses the spring and retracts the damper. Retraction of the damper generates compression damping forces. As the wheel passes over the positive obstacle or as the wheel encounters a negative obstacle (e.g., a depression, a void, etc.), the wheel end travels downward in a rebound motion. A rebound motion extends the spring and the damper thereby transferring energy from the compressed spring into the suspension system and occupants of the vehicle. In a rebound motion, extension of the damper generates recoil damping.

According to the exemplary embodiment shown in FIG. 7, the damper produces little compression damping (e.g., under five kilonewtons at a speed of one meter per second) as the piston moves from an equilibrium point (e.g., where the spring deflection is about zero) toward the compressed end of stroke (e.g., where the spring deflection is about eight inches). In some instances, the forces imparted on the suspension system are sufficient to compress the spring and damper to the end of stroke. At the end of stroke, a portion of the suspension system (e.g., the swing arm) may contact a hard stop (e.g., a polymeric cushion). After encountering the positive obstacle, the spring and the damper extend. According to an exemplary embodiment, the damper generates greater recoil damping forces during extension (e.g., thirty two kilonewtons at a speed of one meter per second). The damper also dissipates energy stored in the compressed spring thereby reducing the likelihood that the spring and damper will overshoot the equilibrium point. As shown in FIG. 7, the damper produces little recoil damping as the piston moves from an equilibrium point toward the extended end of stroke (e.g., where the spring deflection is about negative five inches. According to an exemplary embodiment, the damper provides compression damping as the spring and damper are retracted after encountering the negative obstacle. This differs from conventional off-road suspension systems that add compression damping in the jounce position and allow extension to reposition the damper for another positive obstacle. Such a spring force compensation strategy is intended to separate recoil damping forces and compression damping forces thereby reducing the total acceleration imparted to occupants of the vehicle at the peak of the positive obstacle or lowest point of the negative obstacle. As a result, the vehicle's speed over off-road terrain can be improved for a fixed occupant vibration level. Such a system reduces forces imparted to occupants without the need for sensors, electronic controls, or other components.

Figure 8:
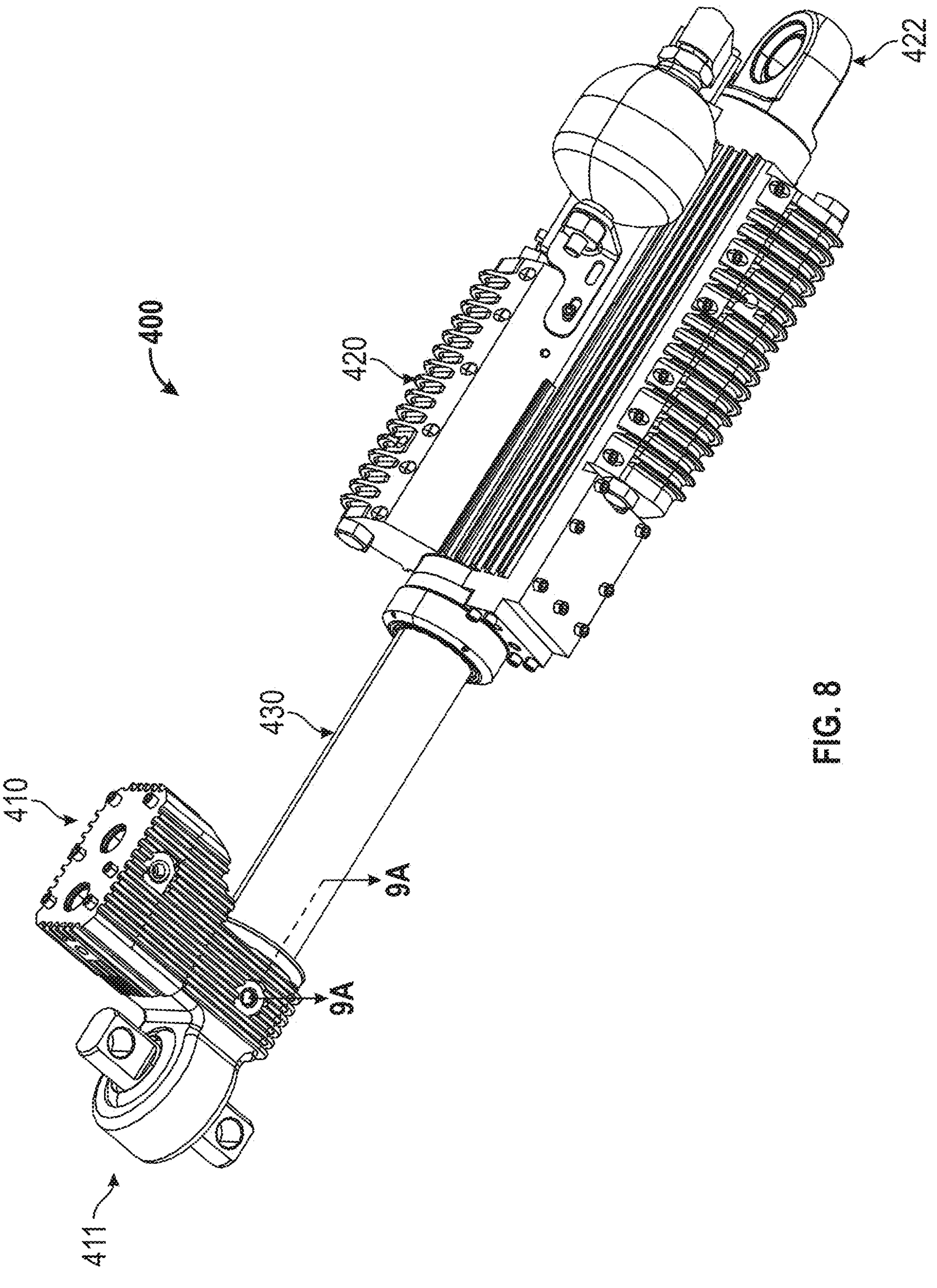
FIG. 8 is an elevation view of a coaxially integrated double damper, according to an exemplary embodiment.
Figure 9A:
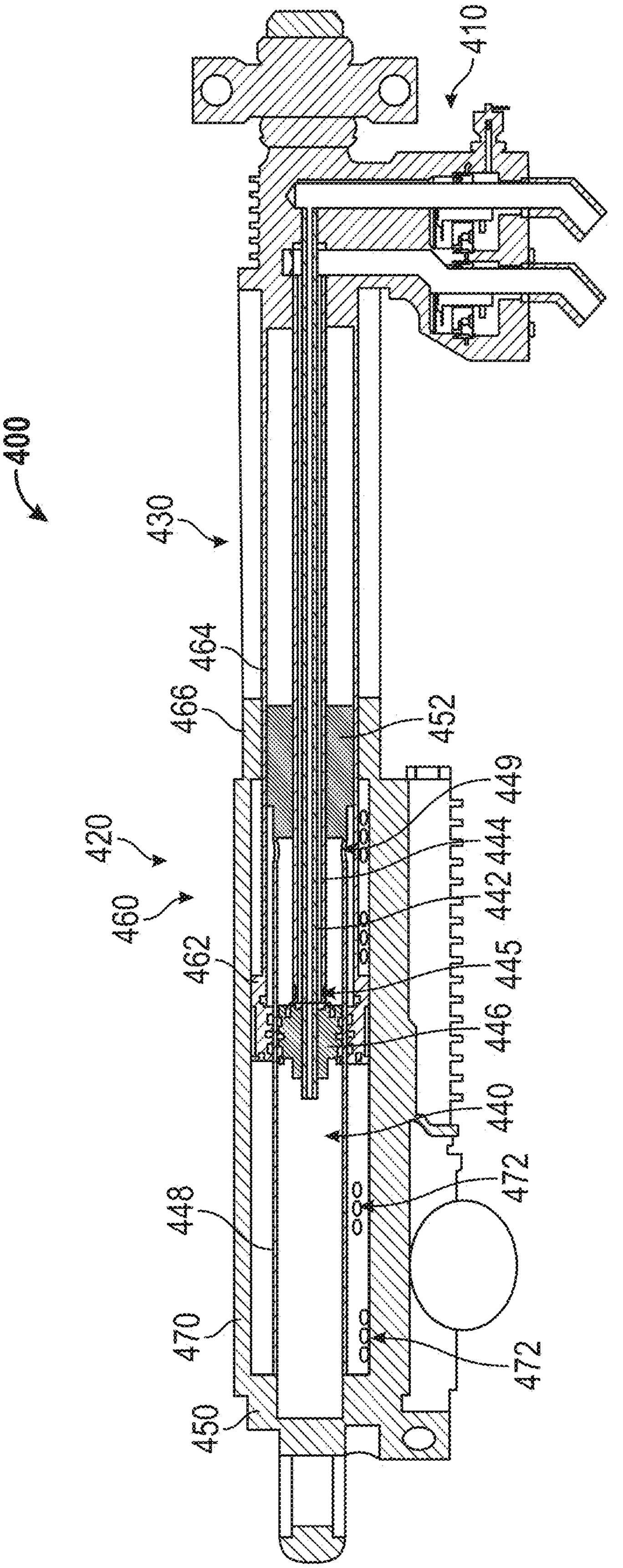
FIGS. 9A-9C are partial sectional views of a coaxially integrated double damper, according to an exemplary embodiment.
Figure 9B:
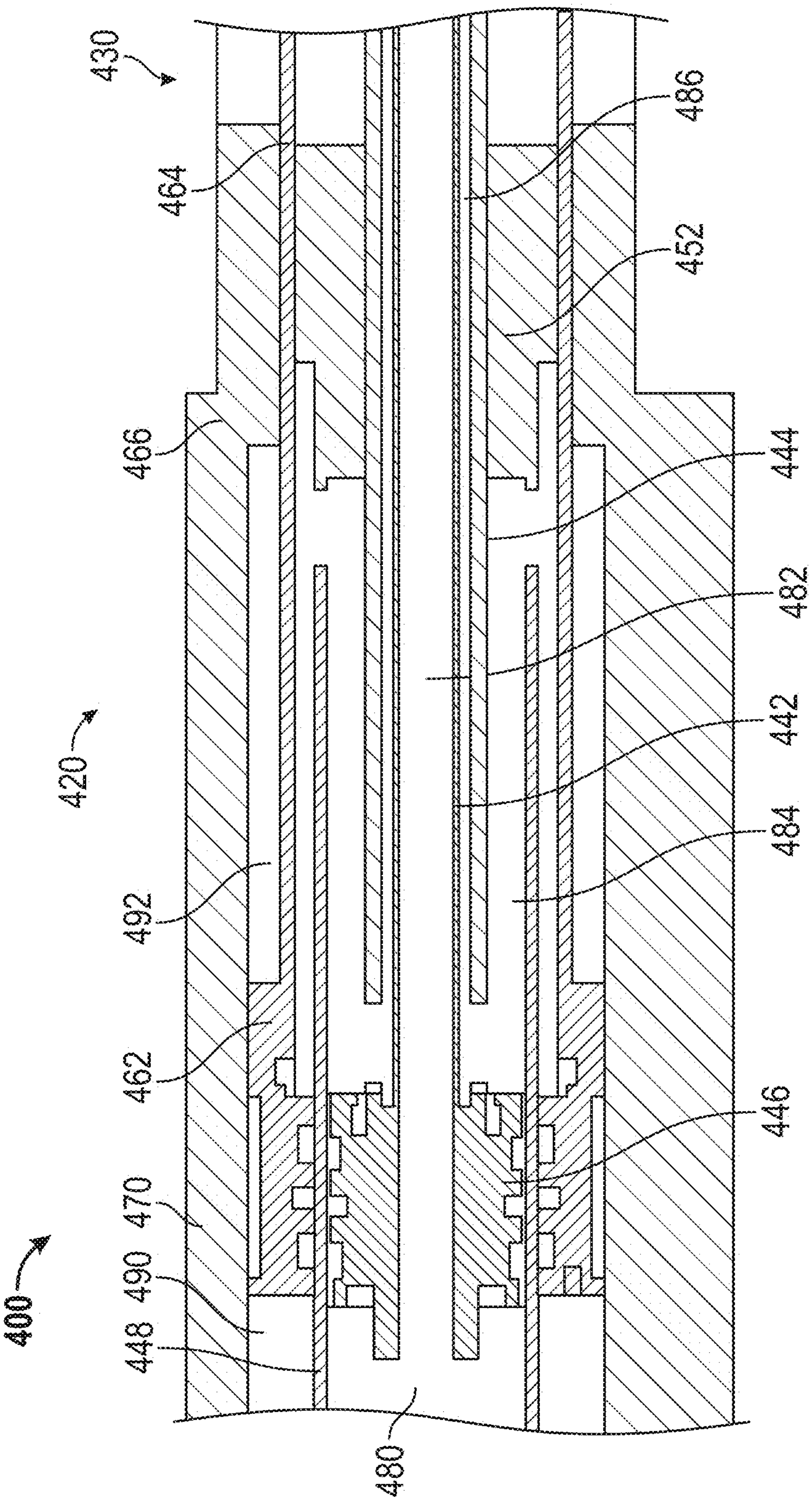
Figure 9C:
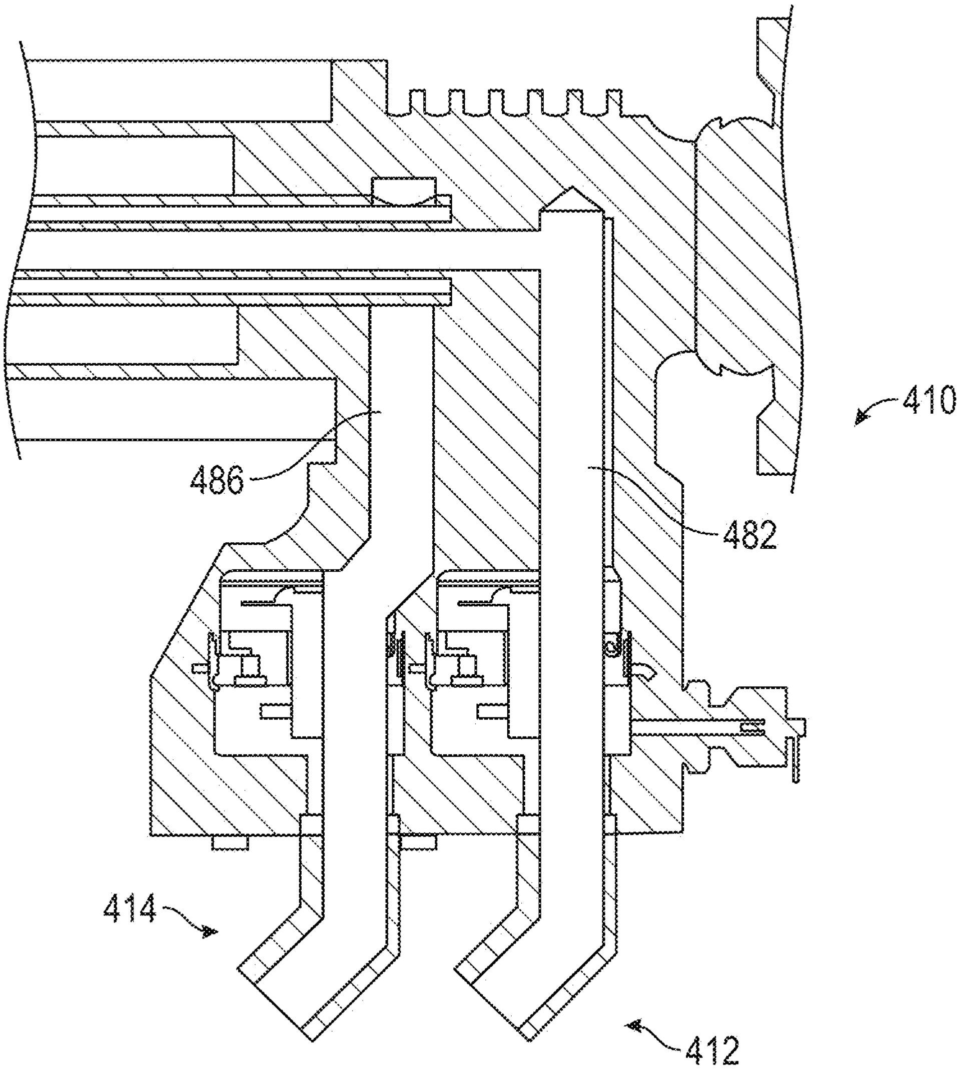

Referring next to the exemplary embodiment shown in FIGS. 8-9C, a damper, shown as damper assembly 400, includes a manifold 410 coupled to a body portion 420 with a rod 430. As shown in FIG. 8, manifold 410 includes an interface, shown as joint 411, that is configured to engage a portion of the vehicle (e.g., the chassis, a hull, etc.). The body portion 420 defines an interface 422 that is configured to engage a portion of the vehicle (e.g., a lower swing arm, etc.). According to an exemplary embodiment, damper assembly 400 is a coaxially integrated double damper that facilitates the spring force compensation strategy while providing damping forces that vary based on the position of the damping piston.

As shown in FIGS. 9A-9C, damper assembly 400 includes a base damper assembly, shown as primary damper 440 (i.e. an inner damper assembly) and a supplemental damper, shown as secondary damper 460 (i.e. an outer damper assembly). According to an exemplary embodiment, the primary damper 440 provides roll control and base damping through an inner damper circuit and the secondary damper 460 provides position dependent damping through an outer damping circuit. The secondary damper 460 provides damping forces that are independent of those provided by primary damper 440. According to an exemplary embodiment, the damping forces provided by secondary damper 460 are negligible in conditions where the primary damper 440 alone is designed to provide damping forces. According to an exemplary embodiment, the primary damper 440 and the secondary damper 460 are integrated into a single unit thereby reducing the size and weight of damper assembly 400. As shown in FIG. 9A, the primary damper 440 and the secondary damper 460 are positioned coaxially, which further reduces the size of primary damper 440 (e.g., relative to two dampers positioned in series or parallel).

According to an exemplary embodiment, the primary damper 440 includes a first tubular member 442 positioned within a second tubular member 444. As shown in FIG. 9A, a first piston, shown as plunger 446, is coupled to an end of first tubular member 442 and second tubular member 444. The primary damper 440 includes a third tubular member 448 at least partially surrounding the second tubular member 444. An aperture, shown as aperture 449, extends through a sidewall of the third tubular member 448. According to an exemplary embodiment, plunger 446 is slidably coupled to an inner surface of third tubular member 448. A first end cap 450 and a second end cap 452 are coupled to opposing ends of third tubular member 448. As shown in FIG. 9A an outer surface of second tubular member 444 is positioned within an aperture defined by second end cap 452.

As shown in FIG. 9A, the secondary damper 460 includes a housing, shown as outer housing 470, a second piston, shown as plunger 462, and a tubular member 464. According to an exemplary embodiment, outer housing 470 defines a plurality of apertures, shown as openings 472. According to an exemplary embodiment, conduits hydraulically couple a portion of the openings 472 to other openings 472 thereby forming at least one hydraulic circuit.

According to an exemplary embodiment, the tubular member 464 is positioned coaxially with the first tubular member 442 and the second tubular member 444. An end cap 466 is coupled to an end of outer housing 470, and the tubular member 464 is slidably coupled between the second end cap 452 and the end cap 466. According to an exemplary embodiment, plunger 462 has an annular shape that defines an aperture extending therethrough. The plunger 462 is disposed between an inner surface of the outer housing 470 and an outer surface of third tubular member 448. Referring again to the exemplary embodiment shown in FIG. 9A, an aperture, shown as aperture 445, extends through a sidewall of the second tubular member 444. It should be understood that the components of damper assembly 400 may have various cross-sectional shapes (e.g., cylindrical, rectangular, square, hexagonal, etc.). According to an exemplary embodiment, the components of damper assembly 400 are coupled together with seals (e.g., bushings, o-rings, etc.) that are configured to prevent pressurized fluid from passing between the chambers discussed herein or leaking out of damper assembly 400.

Referring again to FIGS. 9A-9C primary damper 440 and secondary damper 460 define a plurality of flow channels. According to an exemplary embodiment, primary damper 440 defines a compression chamber 480 that is formed by an inner surface of third tubular member 448, first end cap 450, an end of first tubular member 442, and a first face of plunger 446. A flow channel 482 is defined by an inner surface of first tubular member 442 between the compression chamber 480, manifold 410, and a first flow port 412. According to an exemplary embodiment, the primary damper 440 includes an extension chamber 484 defined by an inner surface of tubular member 464, a second face of plunger 446, a portion of plunger 462, and a face of second end cap 452. It should be understood that aperture 445 and aperture 449 facilitate the formation of extension chamber 484 by placing various internal chambers in fluid communication. A flow channel 486 is defined by an inner surface of second tubular member 444, an outer surface of first tubular member 442, manifold 410, and a second flow port 414. According to an exemplary embodiment, the flow channel 482 and the flow channel 486 form the inner damper circuit. An inner surface of the outer housing 470, first end cap 450, an outer surface of third tubular member 448, and a first surface of plunger 462 define a secondary compression chamber 490, and the inner surface of the outer housing 470, end cap 466, an outer surface of tubular member 464, and a second surface of plunger 462 define a secondary extension chamber 492.

Extension and retraction of the damper assembly 400 provides relative movement between a first set of components (e.g., plunger 446, first tubular member 442, second tubular member 444, tubular member 464, end cap 466, etc.) and a second set of components (e.g., outer housing 470, first end cap 450, third tubular member 448, second end cap 452, etc.). Such extension and retraction causes fluid to flow through the flow channel 482 and flow channel 486 in opposite directions (e.g., fluid flows into compression chamber 480 and out of extension chamber 484 as the damper assembly 400 is extended). According to an exemplary embodiment, the area of plunger 446 and first tubular member 442 exposed to compression chamber 480 is approximately equal to the area of plunger 446 and plunger 462 that are exposed to extension chamber 484 thereby providing a one-to-one working area ratio.

Extension and retraction of the damper assembly 400 also provides relative movement between plunger 462 and outer housing 470. According to an exemplary embodiment, plunger 462 is coupled to plunger 446 (e.g., with tubular member 464, manifold 410, and first tubular member 442). As damper assembly 400 is compressed, fluid is forced from secondary compression chamber 490, through a first set of openings 472 to a second set of openings 472 via a conduit, and into a secondary extension chamber 492. As damper assembly 400 is extended, fluid is forced from secondary extension chamber 492, through a first set of openings 472 to a second set of openings 472 via a conduit, and into secondary compression chamber 490. Fluid is forced through specific openings 472 based on the position of plunger 462 within outer housing 470. Certain sets of openings may be deactivated (e.g., due to hydraulic lock, because a set of the openings is obstructed by plunger 462, etc.).

Figure 10:
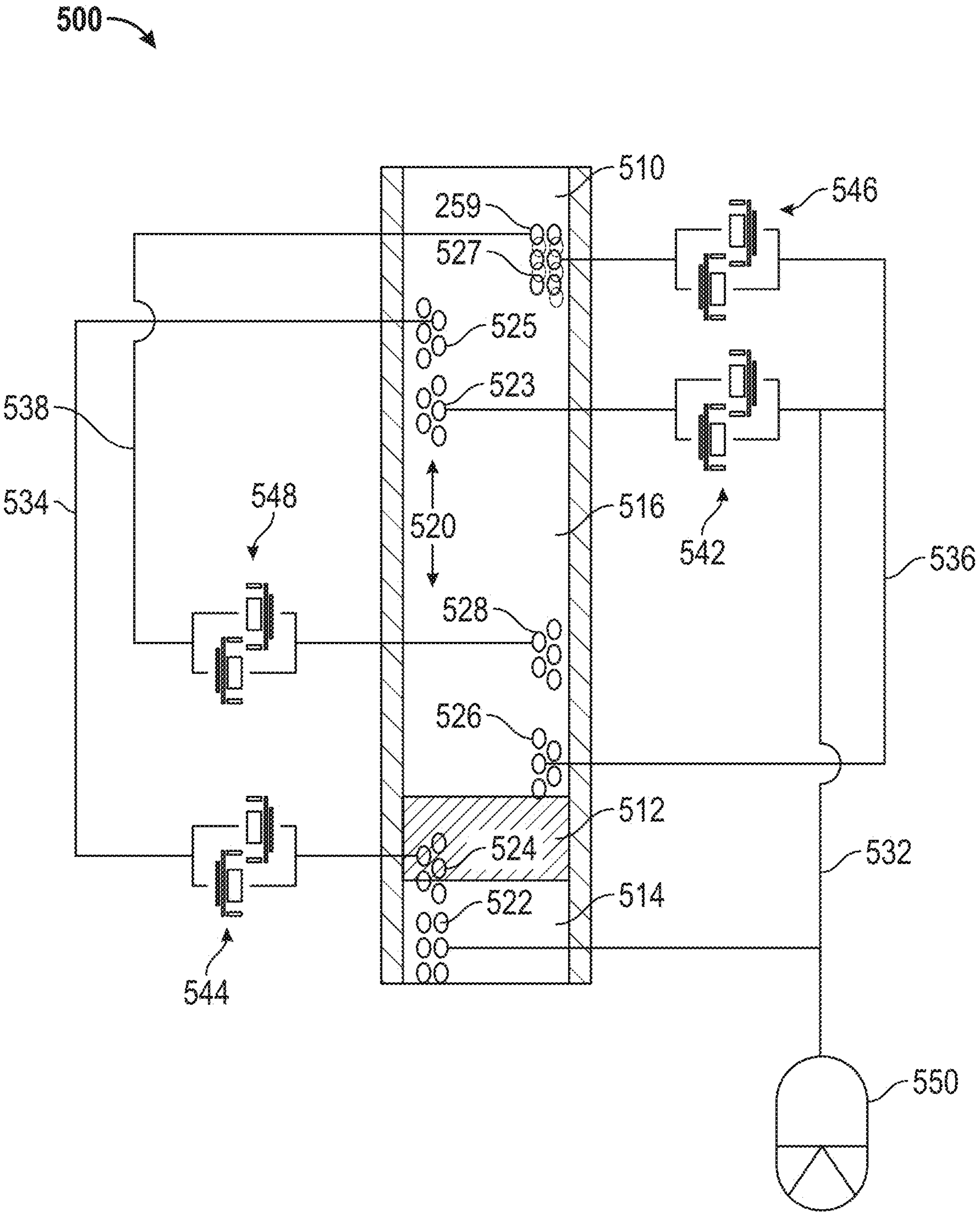
FIG. 10 is a schematic view of an outer damper assembly having a plurality of hydraulic circuits, according to an exemplary embodiment.

Referring next to the exemplary embodiment shown in FIG. 10, a schematic view of the outer damper circuits illustrates a configuration of a secondary damper 500. As shown in FIG. 10, the secondary damper 500 includes a housing, shown as outer housing 510, that defines a plurality of staggered openings 520 through a cylindrical sidewall. The staggered openings 520 may be positioned circumferentially offset from one another and located at various positions along the length of outer housing 510.

According to an exemplary embodiment, the plurality of staggered openings includes a first set having openings 522 and openings 523, a second set having openings 524 and openings 525, a third set having openings 526 and openings 527, and a fourth set having openings 528 and openings 529. Openings 522 are hydraulically coupled to openings 523 with a first conduit 532, openings 524 are hydraulically coupled to openings 525 with a second conduit 534, openings 526 are hydraulically coupled to openings 527 with a third conduit 536, and openings 528 are hydraulically coupled to openings 529 with a fourth conduit 538, according to an exemplary embodiment.

As shown in FIG. 10, a first valve 542, a second valve 544, a third valve 546, and a fourth valve 548 are positioned along first conduit 532, second conduit 534, third conduit 536, and fourth conduit 538, respectively. According to an exemplary embodiment, such valves are bi-directional flow valves configured to differentially restrict a fluid flow based on the direction that the fluid is flowing. A piston, shown as plunger 512, is coupled to outer housing 510 and separates an inner volume of outer housing 510 into a compression chamber 514 and an extension chamber 516. As shown in FIG. 10, a reservoir, shown as accumulator 550, is coupled to first conduit 532. Accumulator 550 may provide a supplemental volume of fluid to, by way of example, reduce cavitation and foaming of the fluid.

According to an exemplary embodiment, secondary damper 500 provides damping forces that vary based on a position of plunger 512 along outer housing 510. As the plunger 512 translates, a series of staggered openings 520 are activated or deactivated. The particular openings that are activated and the number of openings that are activated both contribute to the damping forces provided by secondary damper 500, according to an exemplary embodiment. As shown in FIG. 10, the openings are asymmetrically positioned along the length of outer housing 510, which contributes to the production of damping forces that are different at each end of stroke. According to an exemplary embodiment, the secondary damper 500 implements a spring force compensation damping strategy and provides damping that varies based on the position of the plunger 512 and the direction that the plunger 512 is traveling. Specifically, recoil damping is added when the spring force is high (e.g., in the jounce position), and compression damping is added when the spring force is low (e.g., in the rebound position).

Figure 11C:
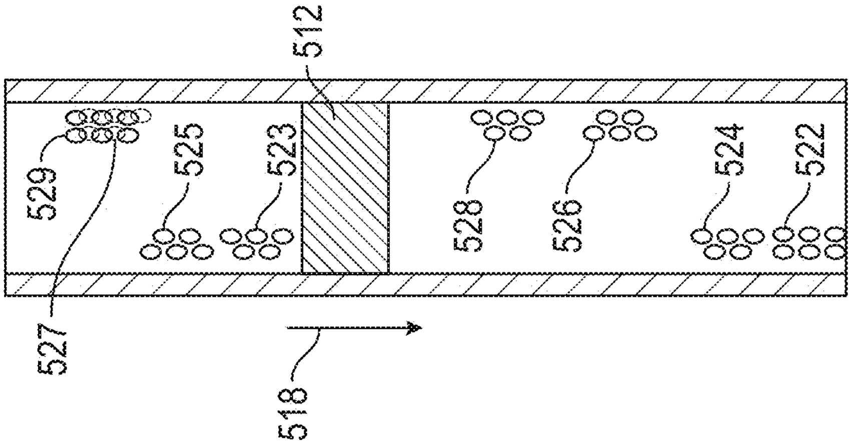
FIGS. 11A-11F are schematic sectional views of an outer damper assembly showing varying piston locations, according to an exemplary embodiment.
Figure 11B:
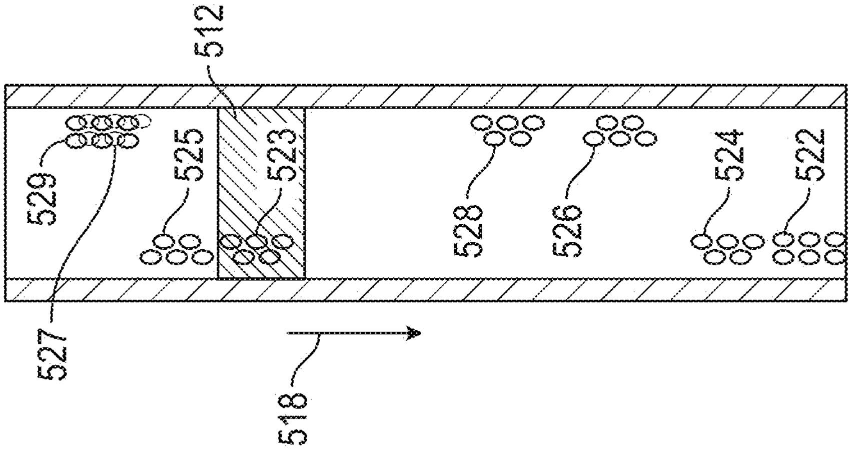
Figure 11A:
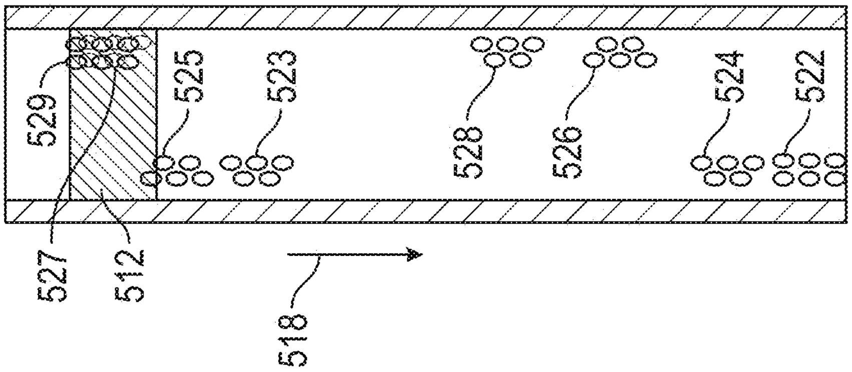

Referring next to FIGS. 11A-11F, plunger 512 is shown as translating along outer housing 510 from an extended position to a retracted position (e.g., after the vehicle encountered a negative obstacle). The staggered openings 520 may be hydraulically coupled, as shown in FIG. 10. Fluid flows through certain staggered openings 520 based on the position of plunger 512, thereby creating seven position dependent damping zones. As shown in FIG. 11A, plunger 512 is initially positioned at full extension and translates in initial compression along direction of travel 518. Based on the position and travel direction of plunger 512, fluid flows from openings 526 and openings 528 to openings 527 and openings 529, respectively (e.g., due to a pressure differential between the fluid at openings 526 and openings 527). The flow paths from openings 522 to openings 523 and openings 524 to openings 525 are deactivated due to hydraulic lock (i.e. pressurized fluid is exposed to both sides of each hydraulic circuit thereby preventing fluid from flowing between the openings).

As shown in FIG. 11B, the plunger 512 translated along direction of travel 518. In such a position, the flow path between openings 522 and openings 523 is deactivated (e.g., because plunger 512 is blocking openings 523), and fluid flow occurs from openings 524 to openings 525, openings 526 to openings 527, and openings 528 to openings 529. As shown in FIG. 11C, plunger 512 has traveled beyond openings 523 and fluid flow occurs from openings 522 to openings 523, openings 524 to openings 525, openings 526 to openings 527, and openings 528 to openings 529. According to an exemplary embodiment, minimal fluid restriction occurs when plunger 512 is positioned between openings 523 and openings 528 such that the secondary damper produces a lowest level of damping forces.

Figure 11F:
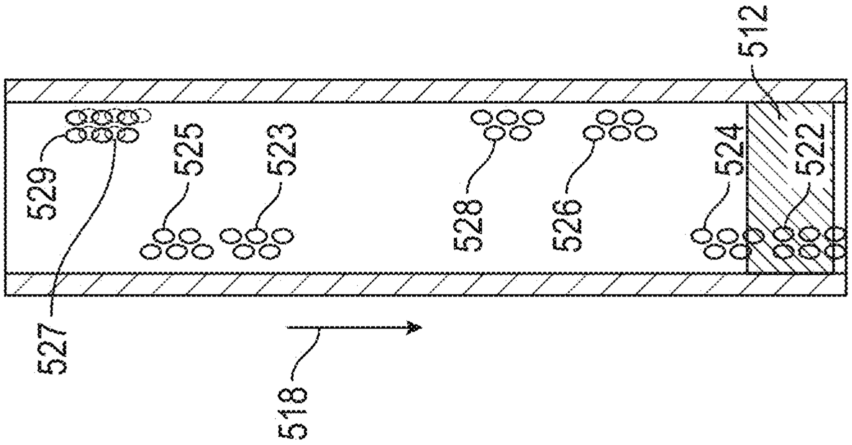
Figure 11E:
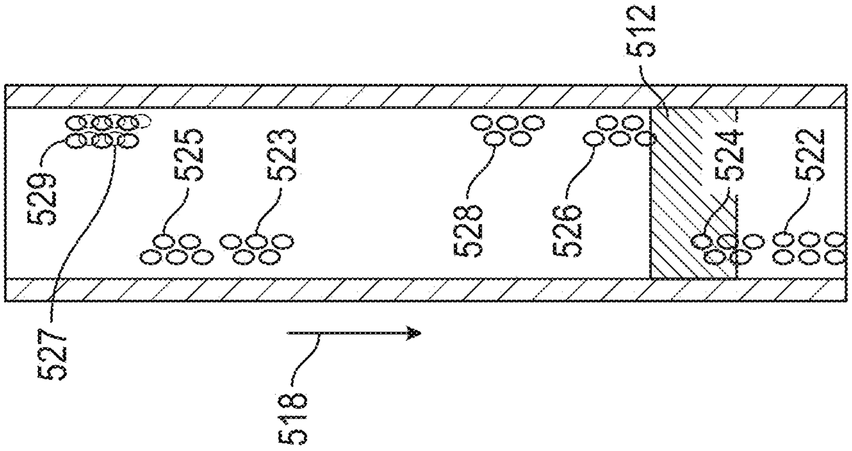
Figure 11D:
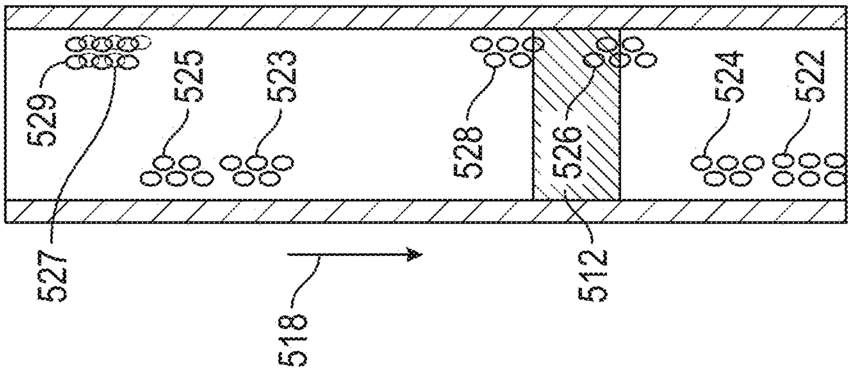

Referring next to FIG. 11D, plunger 512 compressed beyond a mid-range of stroke, and fluid flow occurs from openings 522 to openings 523, openings 524 to openings 525, and from openings 526 to openings 527. The flow path from openings 528 to openings 529 is deactivated due to hydraulic lock. As shown in FIG. 11E, flow occurs from openings 522 to openings 523 and openings 524 to openings 525. The flow paths from openings 526 to openings 527 and openings 528 to openings 529 are deactivated due to hydraulic lock. Referring finally to FIG. 11F, plunger 512 is nearing a compression end of stroke, and fluid flow occurs only from openings 522 to openings 523. The flow paths from 524 to openings 525, openings 526 to openings 527, and openings 528 to openings 529 are deactivated due to hydraulic lock.

Referring again to FIG. 10, fluid flowing between the openings along the conduits interacts with valves. According to an exemplary embodiment, valve 546 and valve 548 have greater damping coefficients (i.e. flow is more restricted) as the fluid flows from openings 526 to openings 527 and from openings 528 to openings 529 (e.g., as illustrated in FIGS. 11A-11C) than when fluid flows from openings 527 to openings 526 and openings 529 to openings 528 (e.g., as plunger 512 moves in a direction opposite direction of travel 518). Such a valve 546 and valve 548 facilitate damping that varies with the direction that plunger 512 is traveling. According to an exemplary embodiment, FIGS. 11A-11C illustrate initial compression after a wheel end encounters a negative obstacle, and valve 546 and valve 548 provide compression damping as part of a spring force compensation strategy. The valve 546 and the valve 548 do not restrict flow to the same extent, thereby providing lower damping forces, as plunger 512 travels along direction of travel 518 and fluid flow occurs from openings 526 to openings 527 and openings 528 to openings 529.

According to an exemplary embodiment, valve 542 and valve 544 have a first level of damping coefficients (e.g., to produce a low level of damping) as fluid flow occurs from openings 522 to openings 523 and openings 524 to openings 525. Such a flow path occurs as plunger 512 approaches a compression end of stroke, as shown in FIGS. 11D-11F. According to an exemplary embodiment, valve 542 and valve 544 have a greater level of damping coefficients (e.g., to produce a large level of damping) as fluid flow occurs from openings 523 to openings 522 and openings 525 to openings 524. Such flow may occur as plunger 512 moves in a direction opposite direction of travel 518 from the position shown in FIG. 11F. According to an exemplary embodiment, valve 542 and valve 544 provide recoil damping as part of a spring force compensation strategy. The number of flow paths that are activated and the characteristics of the valves along the activated flow paths contribute to the damping forces that the secondary damper 500 provides.

Figure 12:
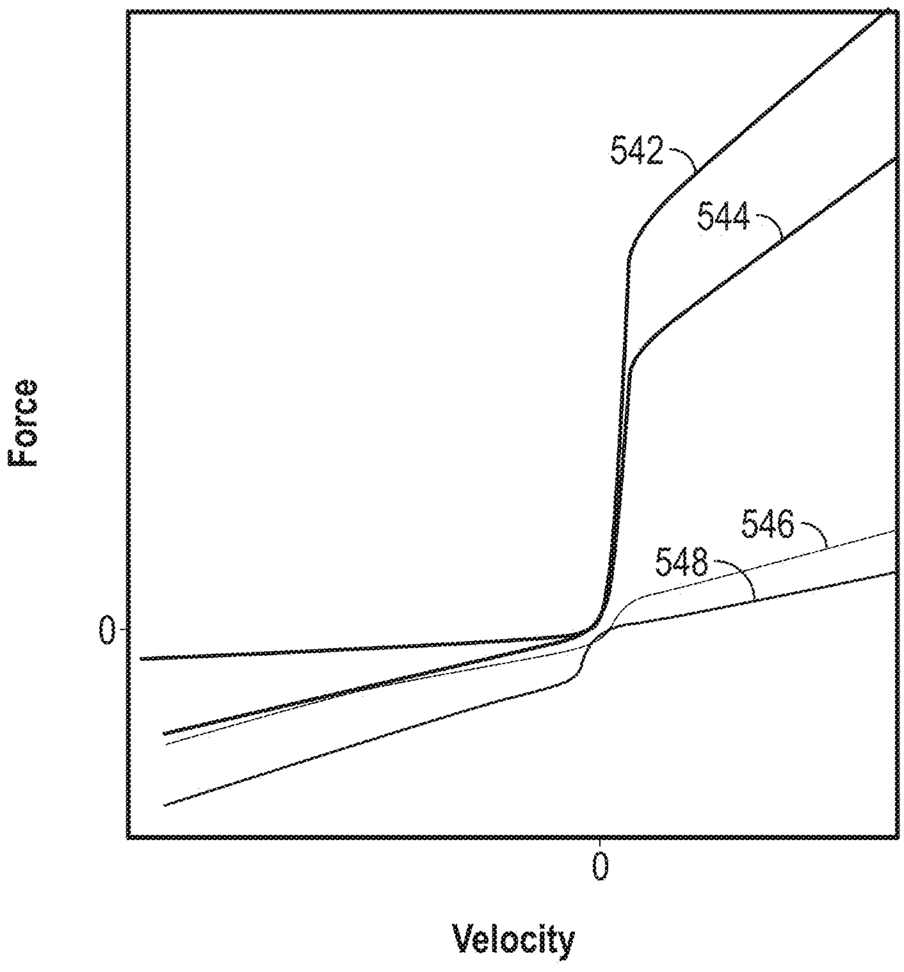
FIG. 12 is a graphical representation of force versus velocity for valves of an outer damper assembly, according to an exemplary embodiment.

Referring next to FIG. 12, a graphical representation of force versus velocity is shown for the various valves of the secondary damper. According to an exemplary embodiment, valve 542 is designed to provide a large damping force for positive flow velocity (e.g., fluid flow from openings 523 to openings 522) and a small damping force for negative flow velocity (e.g., fluid flow from openings 522 to openings 523). As shown in FIG. 12, valve 544 also provides a large damping force for positive flow velocity and a small damping force for negative flow velocity. A spring force compensation strategy may impart large recoil damping during compression of the secondary damper with valve 542 and valve 544 without providing large compression damping (e.g., due to the small damping force generated by valve 542 and valve 544 for flow from openings 522 and openings 524 to openings 523 and openings 525). According to an exemplary embodiment, valve 548 produces larger damping forces for flow from openings 528 to openings 529 than for flow from openings 529 to openings 528. The openings 527 and the openings 529 are positioned such that flow occurs concurrently through valve 546 and valve 548 (i.e. valve 546 and valve 548 provide supplemental damping forces). According to an exemplary embodiment, valve 546 and valve 548 provide large compression damping during extension of the secondary damper without providing large recoil damping as the spring is extended.

Figure 13:
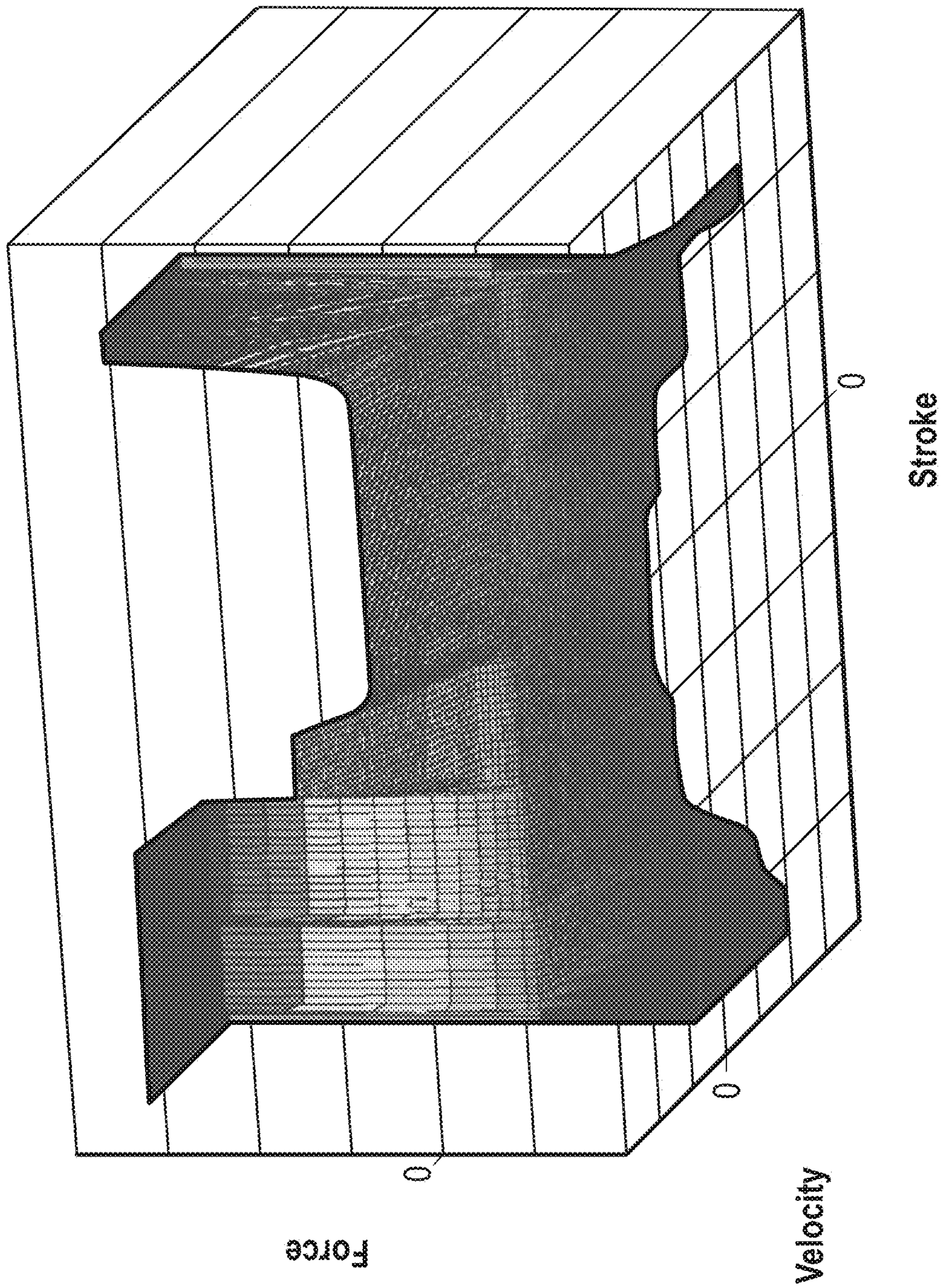
FIG. 13 is a graphical representation of force versus velocity and position of an outer damper assembly, according to an exemplary embodiment.
Figure 14:
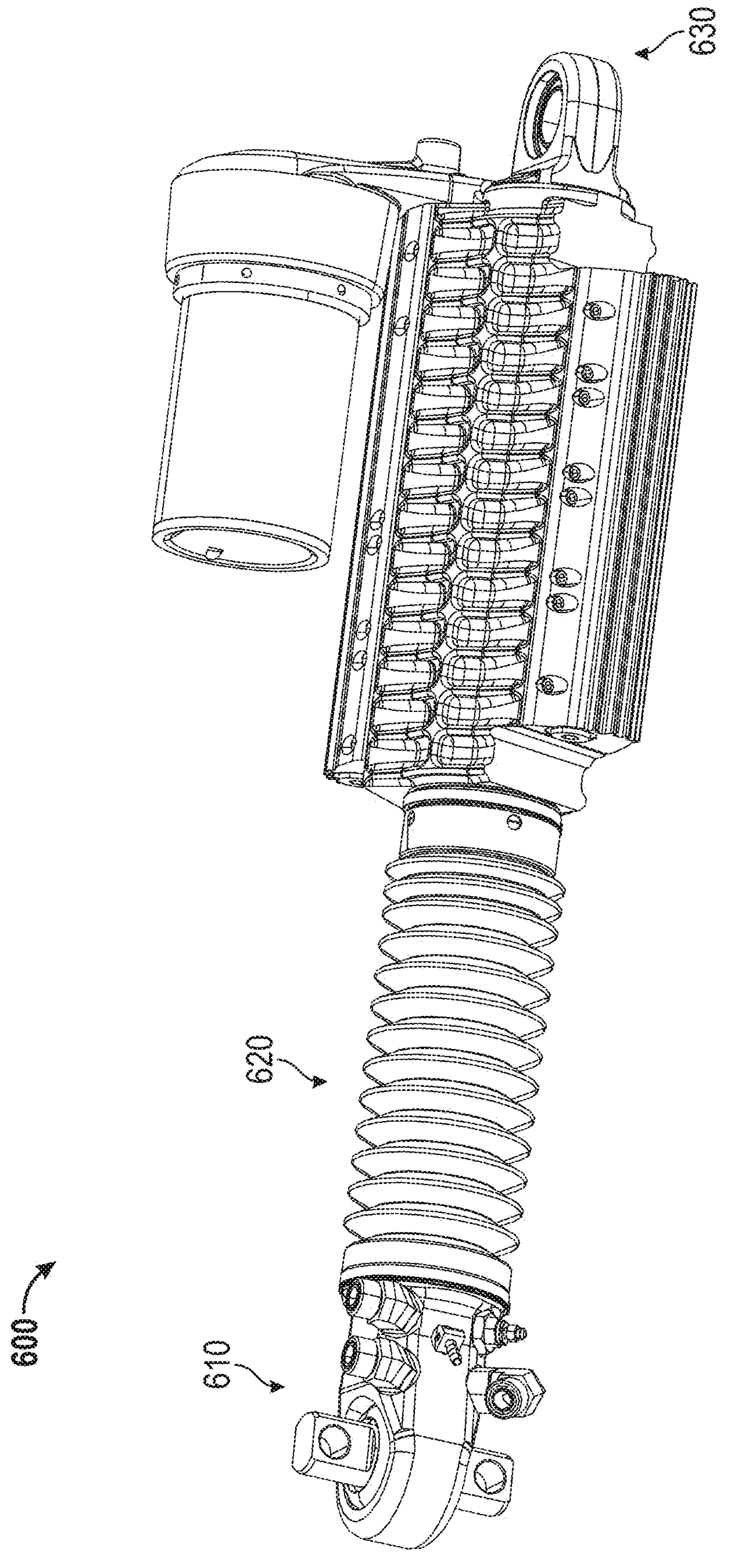
FIG. 14 is an elevation view of a coaxially integrated double damper, according to an exemplary embodiment.

Referring next to FIG. 13, a three-dimensional representation of damping force as a function of velocity and displacement (i.e. stroke) of the piston within the secondary damper is shown, according to an exemplary embodiment. As shown in FIG. 13, the secondary damper provides damping forces that vary based on the position of the piston. The damping forces also vary based on the direction that the piston is traveling (e.g., a positive velocity, a negative velocity, etc.). According to an exemplary embodiment, the secondary damper provides large damping forces (e.g., 15 kilonewtons) in rebound velocity at maximum bump travel (i.e. initial compression from maximum extension).

Referring next to the exemplary embodiment shown in FIGS. 14-18, a damper assembly, shown as coaxial double damper assembly 600, includes a manifold 610, a rod portion 620, and a body portion 630. According to an exemplary embodiment, coaxial double damper assembly 600 provides damping forces as rod portion 620 extends and retracts relative to body portion 630. As shown in FIGS. 15A-15C, coaxial double damper assembly 600 includes a base damper assembly (i.e. an inner damper assembly), shown as primary damper 640, and a supplemental damper, shown as secondary damper 660. According to an exemplary embodiment, the primary damper 640 provides roll control and base damping through an inner damper circuit and the secondary damper 660 provides position dependent damping through an outer damping circuit. The secondary damper

Figure 15A:
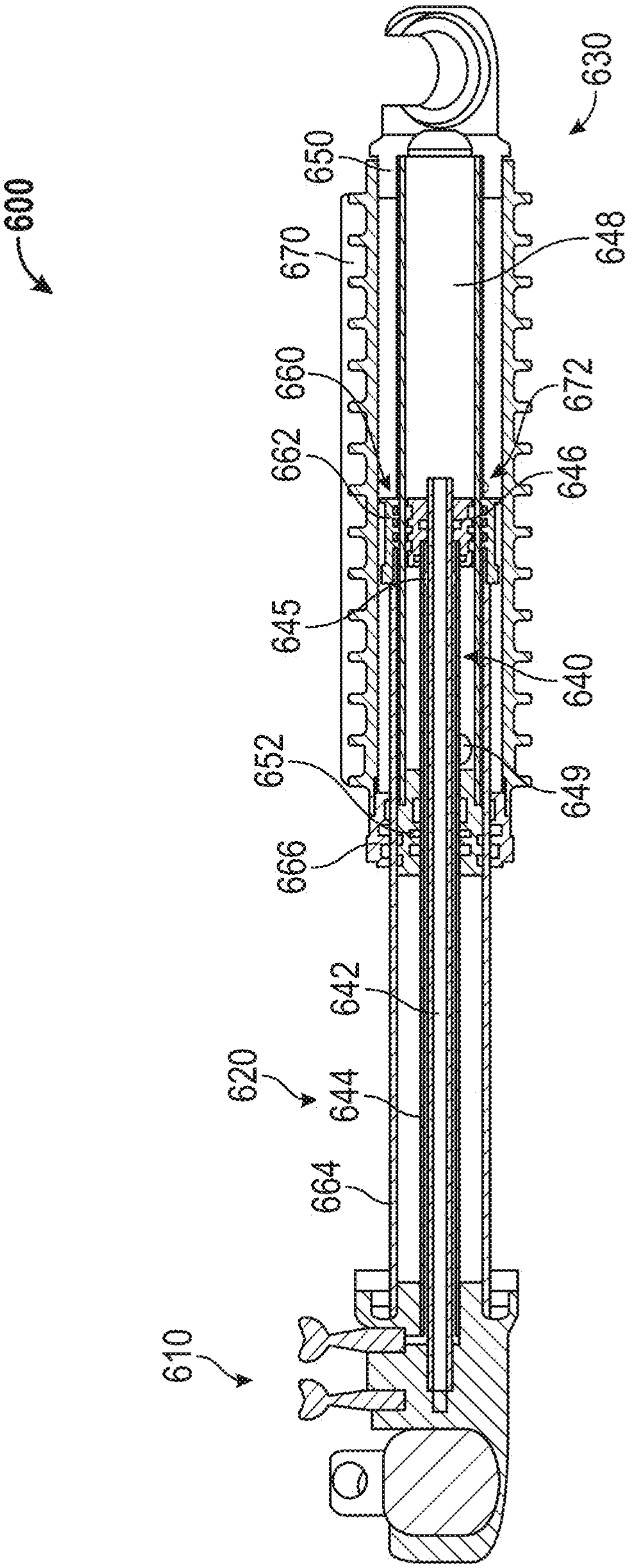
FIGS. 15A-15C are sectional views of a coaxially integrated double damper, according to an exemplary embodiment.
Figure 15B:
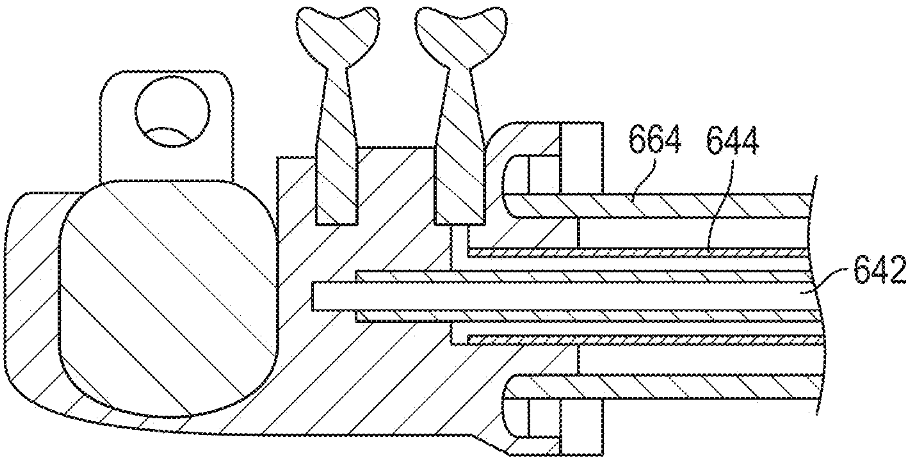
Figure 15C:
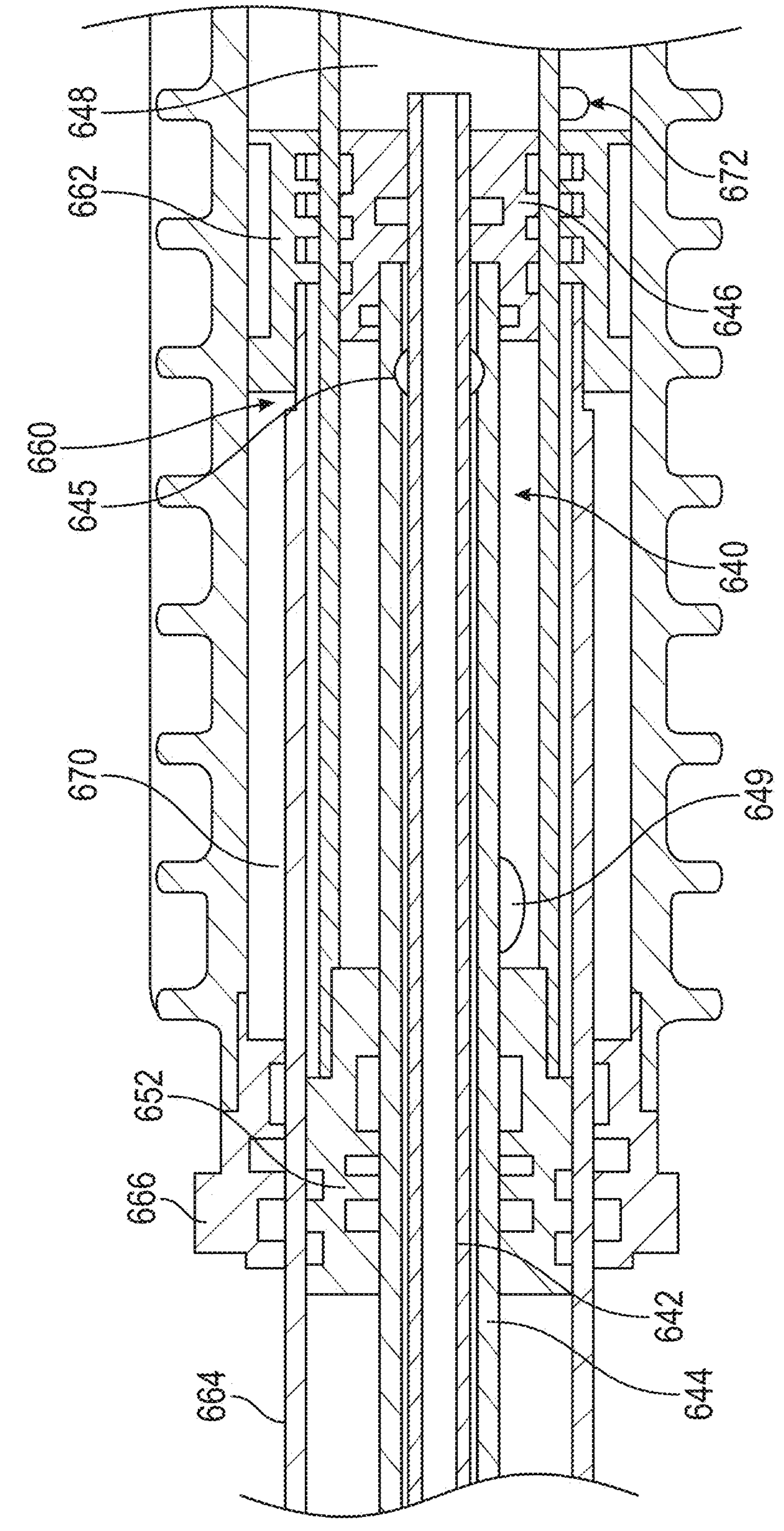

660 provides damping forces that are independent of those provided by primary damper 640. According to an exemplary embodiment, the damping forces provided by secondary damper 660 are negligible in conditions where the primary damper 640 alone is designed to provide damping forces. According to an exemplary embodiment, the primary damper 640 and the secondary damper 660 are integrated into a single unit thereby reducing the size and weight of the coaxial double damper assembly 600. As shown in FIG. 15A, the primary damper 640 and the secondary damper 660 are positioned coaxially, which further reduces the size of damper assembly 440 (e.g., relative to two dampers positioned in parallel).

According to an exemplary embodiment, the primary damper 640 includes a first tubular member 642 positioned within a second tubular member 644. As shown in FIG. 15A, a first piston, shown as plunger 646, is coupled to an end of first tubular member 642 and second tubular member 644. The primary damper 640 includes a third tubular member 648 at least partially surrounding the second tubular member 644. An aperture, shown as aperture 649, extends through a sidewall of the third tubular member 648. According to an exemplary embodiment, plunger 646 is slidably coupled to an inner surface of third tubular member 648. A first end cap 650 and a second end cap 652 are coupled to opposing ends of third tubular member 648. As shown in FIG. 15A, an outer surface of second tubular member 644 is positioned within an aperture defined by second end cap 652.

As shown in FIG. 15A, the secondary damper 660 includes a housing, shown as outer housing 670, a second piston, shown as plunger 662, and a tubular member 664. According to an exemplary embodiment, outer housing 670 defines a plurality of apertures, shown as openings 672. According to an exemplary embodiment, conduits hydraulically couple a portion of the openings 672 to other openings 672 thereby forming at least one hydraulic circuit.

According to an exemplary embodiment, the tubular member 664 is positioned coaxially with the first tubular member 642 and the second tubular member 644. An end cap 666 is coupled to an end of outer housing 670, and the tubular member 664 is slidably coupled between the second end cap 652 and the end cap 666. According to an exemplary embodiment, plunger 662 has an annular shape that defines an aperture extending therethrough. The plunger 662 is disposed between an inner surface of the outer housing 670 and an outer surface of third tubular member 648. Referring again to the exemplary embodiment shown in FIGS. 15A-15C, an aperture, shown as aperture 645, extends through a sidewall of the second tubular member 644. It should be understood that the components of coaxial double damper assembly 600 may have various cross-sectional shapes (e.g., cylindrical, rectangular, square, hexagonal, etc.). According to an exemplary embodiment, the components of coaxial double damper assembly 600 are coupled together with seals (e.g., bushings, o-rings, etc.) that are configured to prevent pressurized fluid from passing between the chambers discussed herein or leaking out of coaxial double damper assembly 600.

Figure 16:
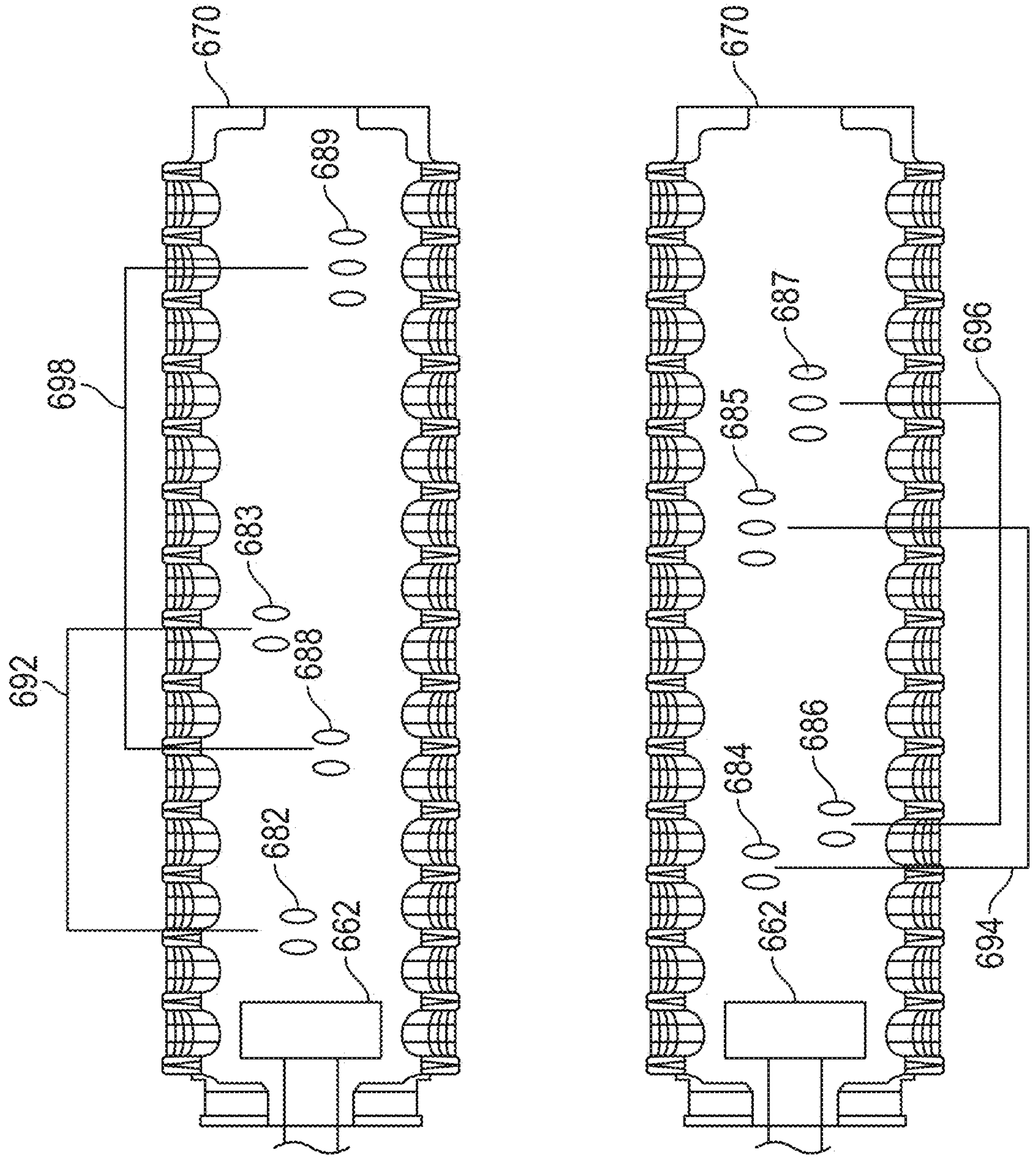
FIG. 16 is a sectional view of an outer housing showing a plurality of openings and conduits, according to an exemplary embodiment.

Referring next to FIG. 16, outer housing 670 defines a plurality of openings 672. According to an exemplary embodiment, openings 672 are offset relative to one another both circumferentially and along the length of outer housing 670. As shown in FIG. 16, the plurality of openings 672 includes a first set having openings 682 and openings 683 that are coupled with a conduit 692, a second set having openings 684 and openings 685 that are coupled with a conduit 694, a third set having openings 686 and openings 687 that are coupled with a conduit 696, and a fourth set having openings 688 and openings 689 that are coupled with a conduit 698. It should be understood that an accumulator may be coupled to at least one of conduit 692, conduit 694, conduit 696, and conduit 698. As plunger 662 translates within outer housing 670 (e.g., due to relative movement between components of a vehicle suspension system) various openings and their corresponding conduits are activated and deactivated. According to an exemplary embodiment, fluid flows through the activated openings and their corresponding conduits to provide damping forces that vary based on position and direction of the plunger 662.

Figure 17A:
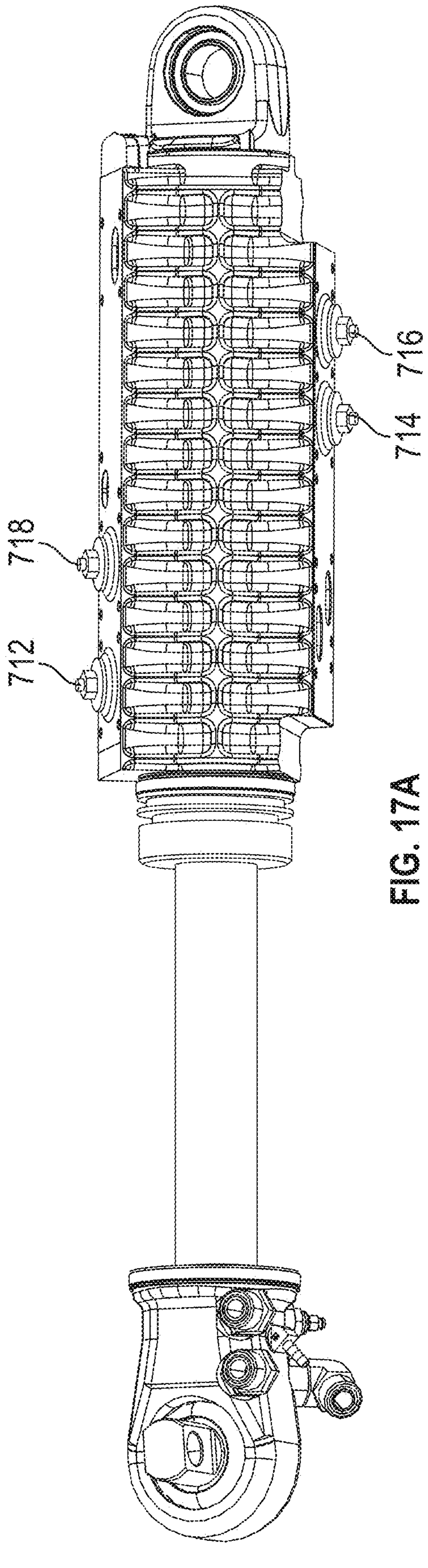
FIGS. 17A-17B are elevation views of an outer damper assembly having flow control valves, according to an exemplary embodiment.
Figure 17B:
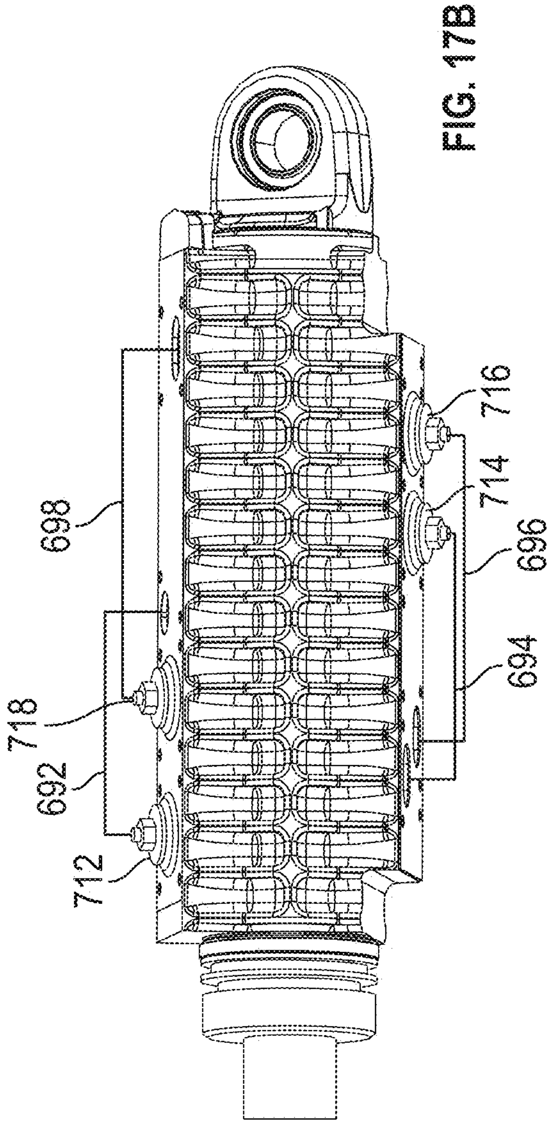

Referring next to FIGS. 17A-17B, a plurality of valves are positioned along the conduits. As shown in FIG. 17B, a valve 712 is positioned along conduit 692, a valve 714 is positioned along conduit 694, a valve 716 is positioned along conduit 696, and a valve 718 is positioned along conduit 698. In the embodiment shown in FIGS. 17A-17B, valve 712, valve 714, valve 716, and valve 718 are coupled to outer housing 670. According to an alternative embodiment, valve 712, valve 714, valve 716, and valve 718 are coupled to another portion of body portion 630 or coupled to a common manifold block. According to an exemplary embodiment, valve 712, valve 714, valve 716, and valve 718 are bidirectional flow valves that differentially restrict a fluid flow based on the direction that the fluid is flowing. Coaxial double damper assembly 600 may provide different damping forces for extension and retraction and different damping forces based on the position of the piston. According to an exemplary embodiment, coaxial double damper assembly 600 provides recoil damping forces in jounce and compression damping forces in recoil as part of a spring force compensation strategy.

Figure 18:
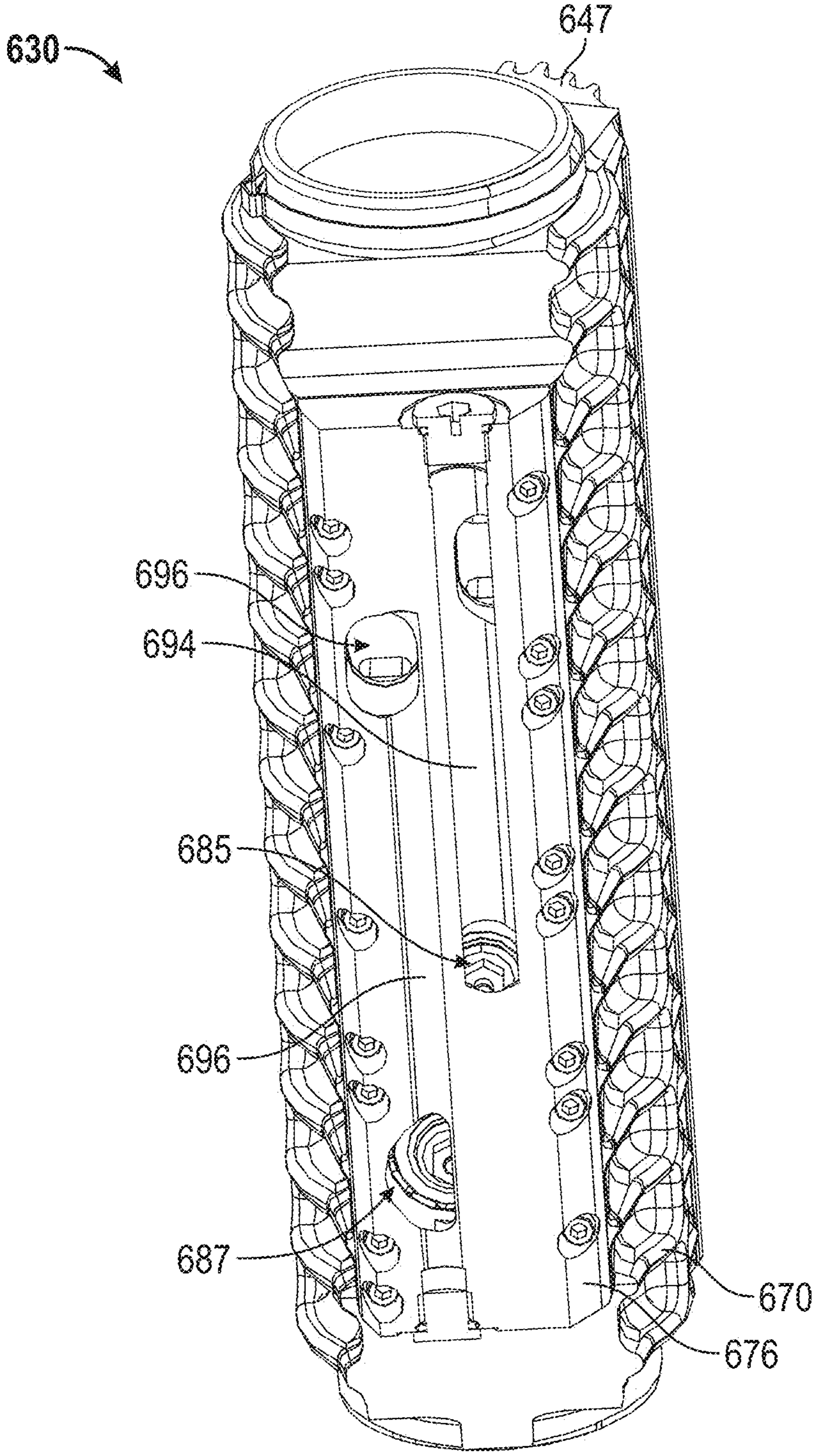
FIG. 18 is a sectional view showing a plurality of conduits that couple the openings within the outer housing, according to an exemplary embodiment.

According to the exemplary embodiment shown in FIG. 18, body portion 630 includes outer housing 670, a first cover, shown as drilling member 674, and a second cover, shown as drilling member 676. According to an exemplary embodiment, drilling member 674 and drilling member 676 are removably coupled to outer housing 670 with a plurality of fasteners (e.g., bolts, screws, etc.). According to an alternative embodiment, drilling member 674 and drilling member 676 are integrally formed with outer housing 670. As shown in the sectional view of FIG. 18, drilling member 676 includes a plurality of drillings that form conduit 694 and conduit 696. According to an alternative embodiment, conduit 694 and conduit 696 are formed with tubular members coupled to an outer portion of outer housing 670 or with flow passages formed within outer housing 670.

Figure 19:
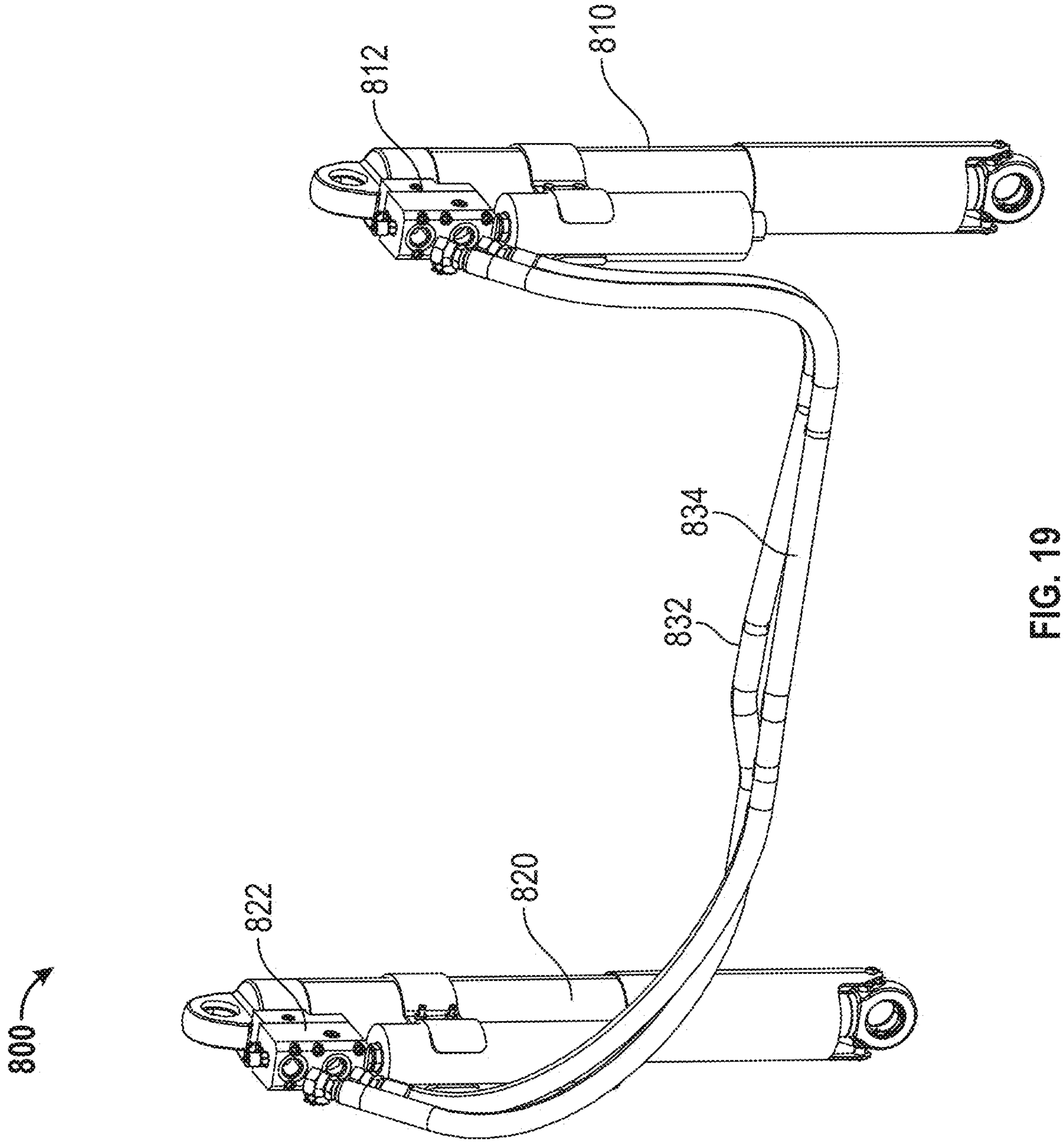
FIG. 19 is an elevation view of a vehicle suspension system having cross-plumbed dampers, according to an exemplary embodiment.

According to an exemplary embodiment, each damper assembly functions independently. Such damper assemblies may include a conduit coupling the chambers on opposing sides of a damping piston (e.g., the compression chamber may be coupled to an extension chamber) to provide a flow path for the compressed fluid. An intermediate accumulator may be positioned between the chambers to reduce the temperature and prolong the life of the fluid. According to the exemplary embodiment shown in FIG. 19, a suspension system 800 includes dampers positioned on opposing lateral sides of the vehicle are cross-plumbed in a walking beam configuration thereby providing anti-roll functionality. As shown in FIG. 19, the suspension system 800 includes a first damper 810 and a second damper 820. First damper 810 and second damper 820 each include a manifold block, shown as manifold 812 and manifold 822, respectively. As shown in FIG. 19, a first hose 832 and a second hose 834 couple manifold 812 to manifold 822. According to an exemplary embodiment, retraction of first damper 810 (e.g., due to a corresponding wheel end impacting a positive obstacle) increases the pressure of a fluid within a compression chamber (e.g., a chamber positioned between a piston and a lower end cap of first damper 810). The pressurized fluid flows through hose 834, which is in fluid communication with an extension chamber (e.g., a chamber positioned between a piston and manifold 822) of first damper 810. According to an exemplary embodiment, the cross-plumbed arrangement shown in FIG. 19 improves roll stiffness for a vehicle.

The construction and arrangements of the damper, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A damper assembly, comprising:

a body portion comprising a housing including a wall defining a first aperture and coupled to a second aperture;

a rod portion extending within the body portion;

a first plunger in sliding engagement with an inner surface of the body portion and coupled to the rod portion; and a second plunger in sliding engagement with an inner surface of the rod portion, the second plunger coupled to the rod portion;

wherein the damper assembly is configured to provide a damping force that varies based on a longitudinal position of the first plunger.

2. The damper assembly of claim 1, wherein the body portion comprises an outer chamber and an inner chamber, and wherein the first plunger is in sliding engagement with the housing within the outer chamber, and the second plunger is positioned within the inner chamber.

3. The damper assembly of claim 1, wherein the body portion comprises a first tubular member coupled within the housing, the first tubular member separating the housing into an inner chamber within the first tubular member and an outer chamber between the first tubular member and the wall of the housing.

4. The damper assembly of claim 1, wherein the body portion comprises a first tubular member coupled within the housing, and wherein the rod portion comprises a second tubular member extending between the first tubular member and the housing.

5. The damper assembly of claim 1, wherein the body portion comprises an outer chamber and an inner chamber, and wherein the rod portion comprises a first tubular member extending within the outer chamber, the first plunger coupled to the first tubular member.

6. The damper assembly of claim 1, wherein the body portion comprises an outer chamber and an inner chamber, and wherein the rod portion comprises a first tubular member extending within the outer chamber and a second tubular member extending within the inner chamber, the second plunger coupled to the second tubular member.

7. The damper assembly of claim 1, wherein the body portion comprises a first tubular member coupled within the housing, the first tubular member separating the housing into an inner chamber within the first tubular member and an outer chamber between the first tubular member and the wall of the housing, the first tubular member defining a third aperture fluidly coupling the inner chamber and the outer chamber.

8. The damper assembly of claim 1, wherein the body portion comprises a first tubular member coupled within the housing, and wherein a first chamber is at least partially defined by the inner surface of the wall, an outer surface of the first tubular member, and a first surface of the first plunger, and wherein a second chamber is at least partially defined by the inner surface of the wall, an outer surface of the rod portion, and a second surface of the first plunger.

9. The damper assembly of claim 8, wherein, in a first position of the first plunger, the first aperture is in direct fluid communication with the first chamber and the second aperture is in direct fluid communication with the second chamber, and wherein, in a second position of the first plunger, the first aperture and the second aperture are both in direct fluid communication with the second chamber.

10. The damper assembly of claim 1, wherein the body portion comprises a first tubular member coupled within the housing, and wherein the rod portion comprises a second tubular member extending between the first tubular member and the housing and a third tubular member extending within the first tubular member.

11. The damper assembly of claim 1, wherein the body portion and the rod portion share a common central axis.

12. The damper assembly of claim 1, wherein the body portion and the rod portion are both coupled to a cap.

13. A damper assembly, comprising:

a housing including a wall that defines an inner volume, a plurality of apertures offset relative to one another, and a first flow path between at least two apertures of the plurality of apertures;

a piston slidably coupled to the housing and separating the inner volume into a first chamber and a second chamber; and a second flow path between at least two apertures of the plurality of apertures;

wherein, in a first position of the piston, the first flow path is activated providing flow between the first chamber and the second chamber;

wherein, in a second position of the piston, the first flow path is deactivated;

wherein, in both the first position and the second position of the piston, the second flow path is activated providing flow between the first chamber and the second chamber; and wherein, in a third position of the piston, both the first flow path and the second flow path are deactivated.

14. The damper assembly of claim 13, wherein the first flow path is between a first aperture and the second aperture, and a second flow path is between a third aperture and a fourth aperture, the third aperture positioned between the first aperture and the second aperture.

15. The damper assembly of claim 14, further comprising:

a first conduit extending outside of the inner volume and fluidly coupling the first aperture and the second aperture; and a second conduit extending outside of the inner volume and fluidly coupling the third aperture and the fourth aperture.

16. A damper assembly, comprising:

a housing defining at least three first apertures that are part of a first flow path and at least three second apertures that are part of a second flow path; and a piston extending within the housing and slidingly engaged to a surface of the housing;

wherein the damper assembly is configured to provide a damping force that varies based on a longitudinal position of the piston relative to the housing.

17. The damper assembly of claim 16, further comprising a tubular member extending within the housing, wherein a plunger is positioned within the tubular member.

18. The damper assembly of claim 16, further comprising a tubular member extending within the housing, wherein the piston is coupled to the tubular member.

* * * * *